US007121165B2

(12) United States Patent
Yamakawa

(10) Patent No.: US 7,121,165 B2
(45) Date of Patent: Oct. 17, 2006

(54) TOOL FOR WRISTWATCH

(75) Inventor: Jindai Yamakawa, Nishitokyo (JP)

(73) Assignee: Citizen Watch Co., Ltd., Tokyo (JP)

( * ) Notice: Subject to any disclaimer, the term of this patent is extended or adjusted under 35 U.S.C. 154(b) by 370 days.

(21) Appl. No.: 10/333,342

(22) PCT Filed: May 15, 2002

(86) PCT No.: PCT/JP02/04701

§ 371 (c)(1),
(2), (4) Date: Jan. 17, 2003

(87) PCT Pub. No.: WO02/095505

PCT Pub. Date: Nov. 28, 2002

(65) Prior Publication Data

US 2003/0167880 A1 Sep. 11, 2003

(30) Foreign Application Priority Data

May 17, 2001 (JP) ............................ 2001-147155

(51) Int. Cl.
*G04D 3/00* (2006.01)
*B23P 19/00* (2006.01)
*B23B 45/16* (2006.01)

(52) U.S. Cl. ............................ 81/6; 173/120; 173/121; 29/764; 29/758

(58) Field of Classification Search .................. 81/463; 206/301; 173/120–121
See application file for complete search history.

(56) References Cited

U.S. PATENT DOCUMENTS 3,210,832 A * 10/1965 Kalen .......................... 29/747
4,070,755 A * 1/1978 Carter ........................ 173/120
4,082,183 A * 4/1978 Sturm ........................ 206/301
4,708,209 A * 11/1987 Aspinwall .................... 173/93
6,370,993 B1 * 4/2002 Pitstick ...................... 81/463
2002/0092786 A1 * 7/2002 Shu ........................... 206/379

FOREIGN PATENT DOCUMENTS

JP 10100 A 7/1958
JP 108300 A 12/1973

(Continued)

*Primary Examiner*—Eugene Kim
*Assistant Examiner*—Urszula M. Cegielnik
(74) *Attorney, Agent, or Firm*—The Webb Law Firm

(57) ABSTRACT

Substantially cylindrical head tube body, center tube body and tip tube body threadedly engage each other to thereby construct a tool main body of a tool for wristwatch. The through hole of the center tube body is provided with a partition part having a small-diameter hole and slant face. A hammering member and compression spring are slidably accommodated in the through hole. A trigger shaft includes a small-diameter part which can be inserted in a center hole of the hammering member, and a large-diameter part continuing therefrom through the slant face, which can pass through the small-diameter hole. A deformed coil spring has the large-diameter part of the trigger shaft fitted therein in wound form, and energizes the trigger shaft toward sliding shaft while slanting the trigger shaft so as to cause the small-diameter part to shift toward the inside wall of the tool main body. The sliding shaft at its rear end includes large-diameter head part and at its front end includes an engagement part to which a wristwatch tool component can be replaceably fixed. The engagement part interlocks a small-diameter hole of the tip tube body with a play, and the front end of the engagement part protrudes from the tip tube body.

21 Claims, 22 Drawing Sheets

FOREIGN PATENT DOCUMENTS

| | | | |
|---|---|---|---|
| JP | 148200 | A | 12/1975 |
| JP | 132277 | A | 8/1982 |
| JP | 163470 | A | 11/1984 |
| JP | 016281 | A | 1/1989 |
| JP | 042875 | A | 3/1989 |
| JP | 099573 | A | 7/1989 |
| JP | 02-279281 | A | 11/1990 |
| JP | 107180 | A | 11/1991 |
| JP | 117571 | A | 12/1991 |
| JP | 011911 | A | 2/1993 |
| JP | 5-123210 | A | 5/1993 |
| JP | 041981 | A | 6/1993 |
| JP | 015982 | A | 3/1994 |
| JP | 10-044057 | A | 2/1998 |
| WO | WO 99/65354 | A1 | 12/1999 |

* cited by examiner

TOOL FOR WRISTWATCH

TECHNICAL FIELD

The present invention relates to a wristwatch tool for removing a band connecting pin, a case back, and other exterior parts of a wristwatch.

DESCRIPTION OF THE PRIOR ART

Among the common wristwatch bands, there are those having a plurality of band pieces or links connected to each other by means of band connecting pins. In these common wristwatch bands, the number of band pieces or links is regulated by removing or inserting band connecting pins, so that the band length can be adjusted. These band connecting pins removed or inserted are called adjust pins. Further, the band connecting pins are also used to connect a band center buckle. The band connecting pins are buried in, for example, band pieces or links, so that a special purpose band connecting pin removing tool is needed for removing operation therefor.

An example of a conventional general band connecting pin removing tool, is disclosed in, for example, Japanese Utility Model Registration No. 2522973. An outline thereof is as follows. A band cradle having side wall portions at its two bottom ends is provided. A rotatable sliding shaft is disposed at one side wall portion of the band cradle. A groove is formed on the other side wall portion of the axis of sliding shaft. A tip pin is secured to the sliding shaft at an eccentric position so as to be able to cope with the thickness of the band mounted on the band cradle. Each band connecting pin is pushed by means of the tip pin so that the band connecting pin is pressed out toward the groove. The disclosed device can be applied to varied bands having slightly different band connecting pin positions only by rotating the sliding shaft.

Furthermore, a special purpose tool is needed for opening a case back of a chamfer structure from a wristwatch case. Wrenches are commonly used for opening the watch case back.

However, in the use of conventional band connecting pin removing tool, occasionally, pins cannot be removed without the application of great force because of the crush of hole for insertion of a band connecting pin or the dislocation of position of hole between band pieces. Therefore the tip pin would be bent or be broken. Further, human press force is limited, so that failure to remove band connecting pins has been experienced when the band connecting pins are rusted or when dust or the like sticks to the holes for insertion of band connecting pins. With respect to the chamfered case back of wristwatch case as well, failure to remove it by wrenching has been experienced when the chamfer portion has been deformed or rusted. At all events, large strength and knack have been needed.

SUMMARY OF THE INVENTION

The present invention has been made with a view toward solving the above problems of the prior art. Accordingly, the object of the present invention is to provide a tool for wristwatch capable of easily removing a band connecting pin, a case back of wristwatch case or the like, which could not be removed with the use of conventional wristwatch tools, with only application of the same given force as in the prior art.

According to one aspect of the present invention, there is provided a wristwatch tool for use in removing a band connecting pin, a case back of a wristwatch case or the like, said tool comprising:

a substantially cylindrical tool main body including, provided thereinside:

a sliding shaft having a front end adapted to permit replaceable securing of a wristwatch tool component, said sliding shaft having the front end protruding from the tool main body; and hammering means, said hammering means comprising:

a compression spring, and a hammering member adapted to be energized and slide toward the sliding shaft by the compression spring, and a trigger member capable of releasing spring force of the compression spring when the compression spring has reached a predetermined compression level, said sliding shaft and said hammering means so arranged that instantaneous large force is applied to the wristwatch tool component by hammering the rear end of the sliding shaft by means of the hammering means.

The tool for wristwatch according to the present invention may be characterized in that the tool main body comprises a head part tube body, a center tube body threadedly engaged with the head part tube body, and a tip tube body threadedly engaged with the center tube body, and wherein inside of the center tube body, a partition part having a hole of small diameter is formed.

Also, the tool for wristwatch according to the present invention may be characterized in that at the side of the tip tube body of the partition part, a slant face, which is extending from the hole of small diameter to an inside wall of the center tube body is formed.

Further, the tool for wristwatch according to the present invention may be characterized in that the hammering member is disposed on the head part tube body side of the partition part, the hammering member being provided with a center hole; and wherein the trigger member is disposed on the tip tube body side of the partition part, the trigger member comprising:

a trigger shaft having a part of small diameter and a part of large diameter, the small diameter part adapted to be inserted in the center hole of the hammering member, the large diameter part adapted to pass through the small diameter hole of the partition part, the large diameter part brought into contact with the rear end of the sliding shaft, and a deformed coil spring capable of energizing the trigger shaft toward the sliding shaft while slanting the trigger shaft, the slanted trigger shaft arranged to compress the compression spring through the hammering member by pressing of the front end of the sliding shaft, the trigger shaft arranged to stand erect in the moment that the large diameter part of the trigger shaft is fitted in the small diameter hole.

Still further, the tool for wristwatch may be characterized in that the compression spring is disposed in the center tube body and the head part tube body, the spring force of the compression spring is adjustable by regulating a length of threaded engagement of the center tube body with the head tube body.

Still further, the tool for wristwatch according to the present invention may be characterized in that further comprising pliers having a one-side functioning part and an other-side functioning part, wherein:

a head part of the tool for wristwatch engages with the inside of the one-side functioning part of the pliers, and the tool main body or the sliding shaft are arranged so as to pass through a through hole of the other-side functioning part of the pliers, the tool for wristwatch further comprising a spring capable of energizing the tool main body toward the one-side functioning part and a jig for fixing a wristwatch exterior part arranged outside the other-side functioning part.

Still further, the tool for wristwatch according to the present invention may be characterized in that the securing of the wristwatch tool component to the front end of the sliding shaft is accomplished by at least one of insertion of a shaft in a shaft hole under pressure, screwing of a shaft in a shaft hole with setscrew hole, engagement of an external thread with an internal thread, interlock of a protrudent part with a recessed part and interlock of a taper shaft with a bearing.

Still further, the tool for wristwatch according to the present invention may be characterized in that at the front end portion of the sliding shaft, an interlock groove for securing the wristwatch tool component is formed, at the center of the wristwatch tool component, a lock hole is formed and inside of the lock hole, a recessed groove is formed, and an o-ring member consisting of en elastic member is fitted in the recessed groove, the O-ring member arranged so as to be fitted in the interlock groove of the sliding shaft, thereby enabling detachably securing the wristwatch tool component to the front end portion of the sliding shaft.

Still further, the tool for wristwatch according to the present invention may be characterized in that the base end portion of the wristwatch tool component is provided with an abutment member consisting of a flexible member.

Still further, the tool for wristwatch according to the present invention may be characterized in that a pin or deformed pin for removing a band connecting pin as the wristwatch tool component is detachably secured.

Still further, the tool for wristwatch according to the present invention may be characterized in that the pin for removing a band connecting pin is constituted of a super-elastic metallic material consisting of an alloy which contains nickel/titanium (Ni—Ti) or nickel/titanium/cobalt (Ni—Ti—Co) as a principal component.

Still further, the tool for wristwatch according to the present invention may be characterized in that the pin for removing a band connecting pin is a push pin at its front end provided with a recessed part of cone shape.

Still further, the tool for wristwatch according to the present invention may be characterized in that the pin for removing a band connecting pin is a push pin at its front end provided with a recessed part consisting of a blind hole adapted to have the connecting pin fitted therein.

Still further, the tool for wristwatch according to the present invention may be characterized in that a wrench for removing a bezel or a case back as the wristwatch tool component is detachably secured.

Still further the tool for wristwatch according to the present invention may be characterized in that the hammering member is disposed on the head part tube body side of the partition part, the hammering member being provided with a center hole, and wherein the trigger member comprises:

a trigger shaft being disposed under the partition part of the center tube body, the trigger shaft at its upper end being provided with an abutment surface of slanted cone shape, the trigger shaft being provided with a vertical through hole, an upper part of the sliding shaft, the upper part adapted to pass through the through hole of the trigger shaft and adapted to be fitted in the center hole of the hammering member, and the hammering member having its upper end portion formed into substantially a dome configuration, the tool for wristwatch is so arranged that the hammering member is energized downward by the compression spring, whereby the lower end of the hammering member is abutted to the abutment surface of slanted cone shape of the upper end of the trigger shaft, resulting that an axial center of the hammering member is based, the tool for wristwatch is so arranged that the upper part of the sliding shaft raises the hammering member by pressing of the front end of the sliding shaft, whereby the compression spring is compressed by the hammering member having been biased toward the inside wall, and the upper end portion of substantially dome configuration of the raised hammering member is guided by the inside wall of the through hole of the center, tube body, whereby the axial center of the hammering member is moved toward the center, with the result that the hammering member stands erect.

Still further, the tool for wristwatch according to the present invention may be characterized in that the hammering member is raised in accordance with rise of the sliding shaft so that a slant face provided on a large diameter part of the lower end portion of the hammering member is guided by the slant face part of the partition part, whereby the axial center of the hammering member is gradually departed from the inner wall and shifts toward center so that the hammering member is thrust upward.

Still further, the tool for wristwatch according to the present invention may be characterized in that a compression coil spring is interposed between a lower end of the trigger shaft and the sliding shaft, the tool for wristwatch is so arranged that the trigger shaft is energized upward by spring force of the compression coil spring, whereby the abutment surface of slanted cone shape of the upper end of the trigger shaft is abutted to the large diameter part of the lower end portion of the hammering member, the tool for wristwatch is so arranged that the sliding shaft is energized downward by the spring force of the compression coil spring, whereby the front end of the sliding shaft protrudes from the tip tube body.

According to the present invention, there is provided a tool for wristwatch, employed to remove a connecting pin from a band connecting pin insertion hole of watchband, said tool comprising:

a substantially cylindrical upper tube body having an inside threaded part provided on an inside wall of lower end portion thereof and having an outside threaded part provided on an outside wall thereof, a removing pin detachably and threadedly engaging the inside threaded part of the upper tube body, and a substantially cylindrical lower tube body of taper outline being detachably fitted to a lower portion of the upper tube body by threadedly engaging an inside threaded part provided on an inner periphery of the lower tube body with the outside threaded part of the upper tube body, the tool for wristwatch is so arranged that a length of protrusion of a front end portion of the removing pin from a through hole of front end of the lower tube body can be adjusted by regulating a condition of threaded engagement of the inside threaded part provided on the inner periphery of upper end portion of the lower tube body with the outside threaded part of the upper tube body.

According to the present invention, further, there is provided a tool for wristwatch, employed to remove a connecting pin in the event that a connecting pin is not completely drawn off from a band connecting pin insertion hole of the watchband, after the connecting pin is removed from the band connecting pin insertion hole by using the tool for wristwatch of the present invention, said tool comprising:

a substantially cylindrical upper tube body having an inside threaded part provided on an inside wall of lower end portion thereof and having an outside threaded part provided on an outside wall thereof, a removing pin being detachably and threadedly engaged with the inside threaded part of the upper tube body, and a substantially cylindrical lower tube body of taper outline being detachably fitted to a lower portion of the upper tube body by threadedly engaging an inside threaded part provided on an inner periphery of the lower tube body with the outside threaded part of the upper tube body, the tool for wristwatch is so arranged that a length of protrusion of a front end portion of the removing pin from a through hole of front end of the lower tube body can be adjusted by regulating a condition of threaded engagement of the inside threaded part provided on the inner periphery of upper end portion of the lower tube body with the outside threaded part of the upper tube body.

The tool for wristwatch according to the present invention may be characterized that at the front end of the lower tube body, an abutment member consisting of a flexible member is disposed.

Also, the tool for wristwatch according to the present invention may be characterized in that the removing pin is constituted of a super-elastic metallic material consisting of an alloy which contains nickel/titanium (Ni—Ti) or nickel/titanium/cobalt (Ni—Ti—Co) as a principal component.

According to still a further aspect of the present invention, there is provided a hold guide member of substantially clip configuration, comprising a pair of clip hold members and a connecting part adapted to couple the clip hold members at base end portions thereof in curved form to thereby impart elasticity, the hold guide member so constructed that a watchband can be fixed by interposing the watchband between the clip hold members.

The hold guide member according to still a further aspect of the present invention may be characterized in that the connecting part is provided with a pin catcher part consisting of a recessed part of through hole configuration adapted to hold a connecting pin so as to prevent dropping of the connecting pin.

According to still a further aspect of the present invention, there is provided a wristwatch tool set of substantially box configuration, comprising:

an underlying box main body, a cover member openably secured to one side of the box main body, and an accommodation member fitted in a box part of the box main body, said accommodation member on its upper surface side provided with:

a recessed part for accommodation for accommodating the tool for wristwatch, a recessed part for accommodation for accommodating the wristwatch tool component defined, and a recessed part for accommodation for accommodating the hold guide member.

The wristwatch tool set according to the present invention may be characterized in that the accommodation member on its upper surface side is further provided with a recessed part for accommodation for accommodating the tool for wristwatch.

DETAILED DESCRIPTION OF THE PREFERRED EMBODIMENTS

Embodiments (Examples) of the present invention will be described in detail below with reference to the appended drawings.

Figure 1:
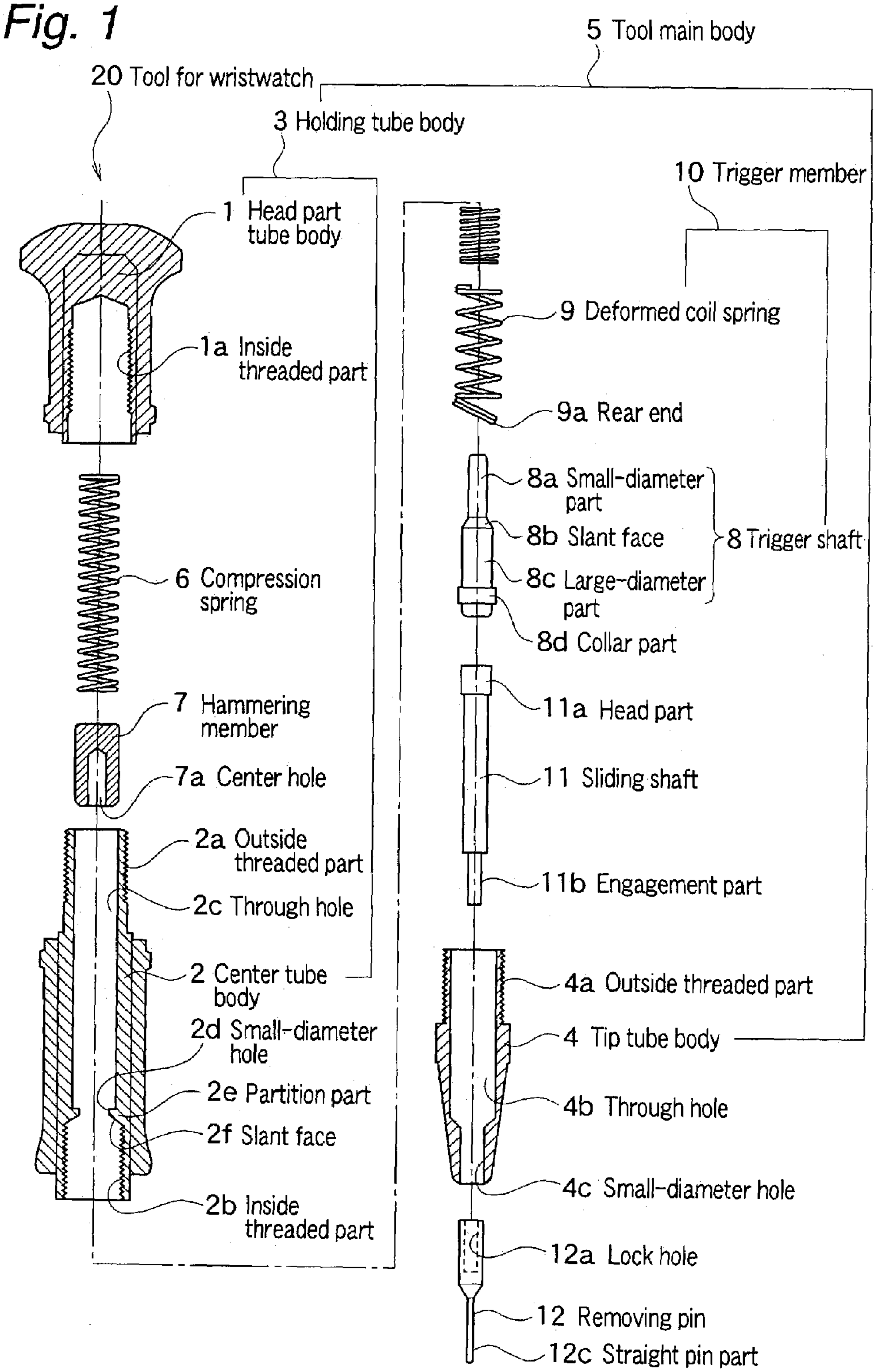
FIG. 1 is an exploded sectional view of a tool for removing a band connecting pin, which is a first form of tool for wristwatch according to the present invention.
Figure 2:
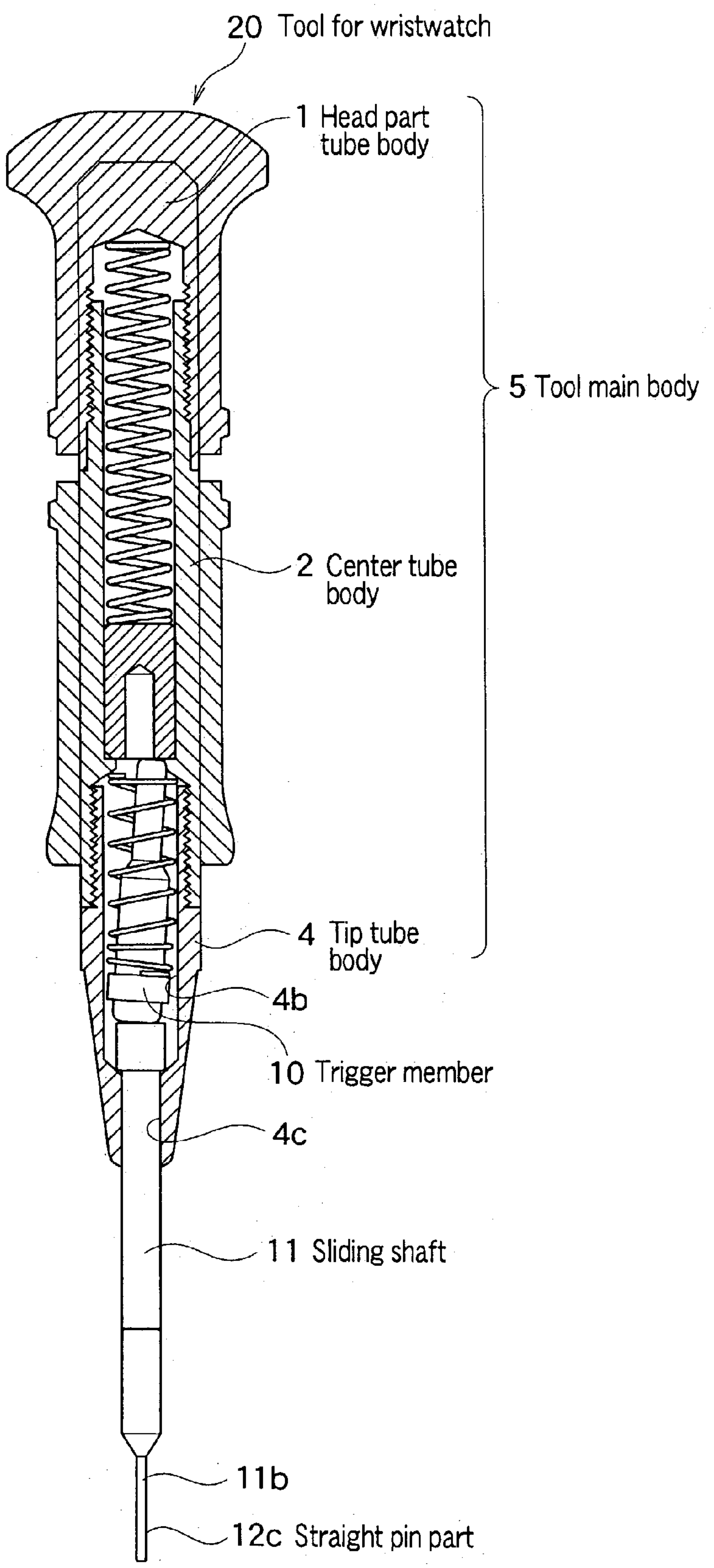
FIG. 2 is a sectional view of the above tool for wristwatch after assembly.
Figure 3:
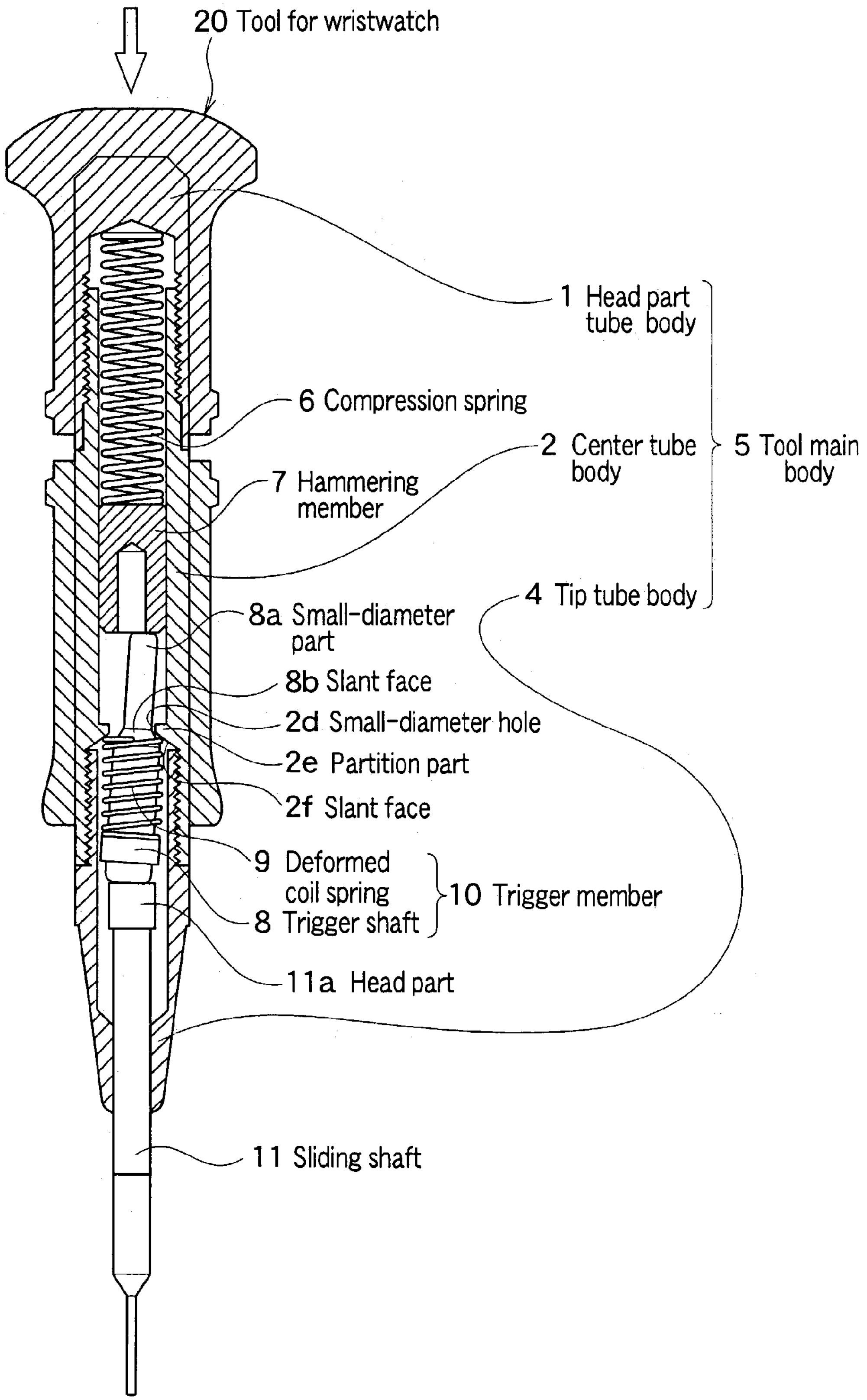
FIG. 3 is a sectional view explaining an operating condition of the above tool for wristwatch.
Figure 4:
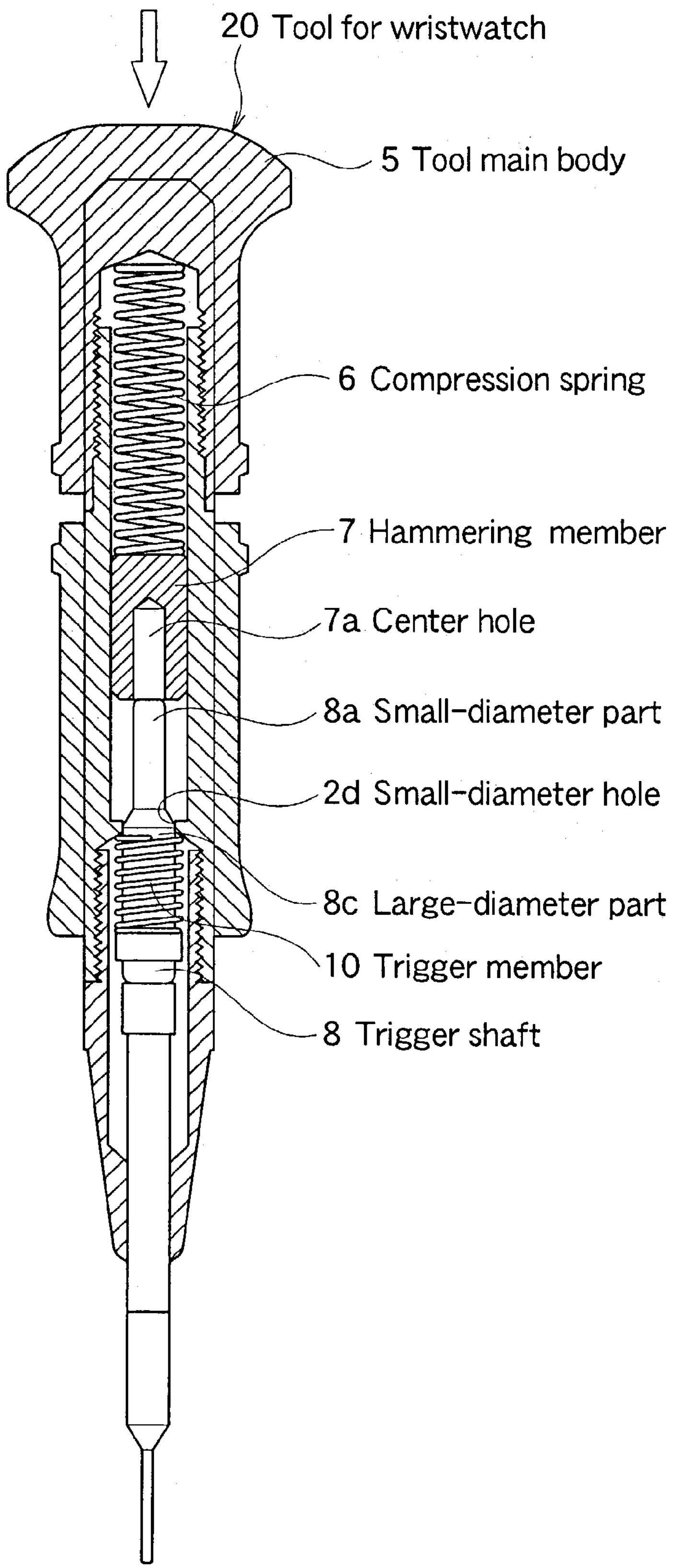
FIG. 4 is a sectional view explaining another operating condition of the above tool for wristwatch.
Figure 5:
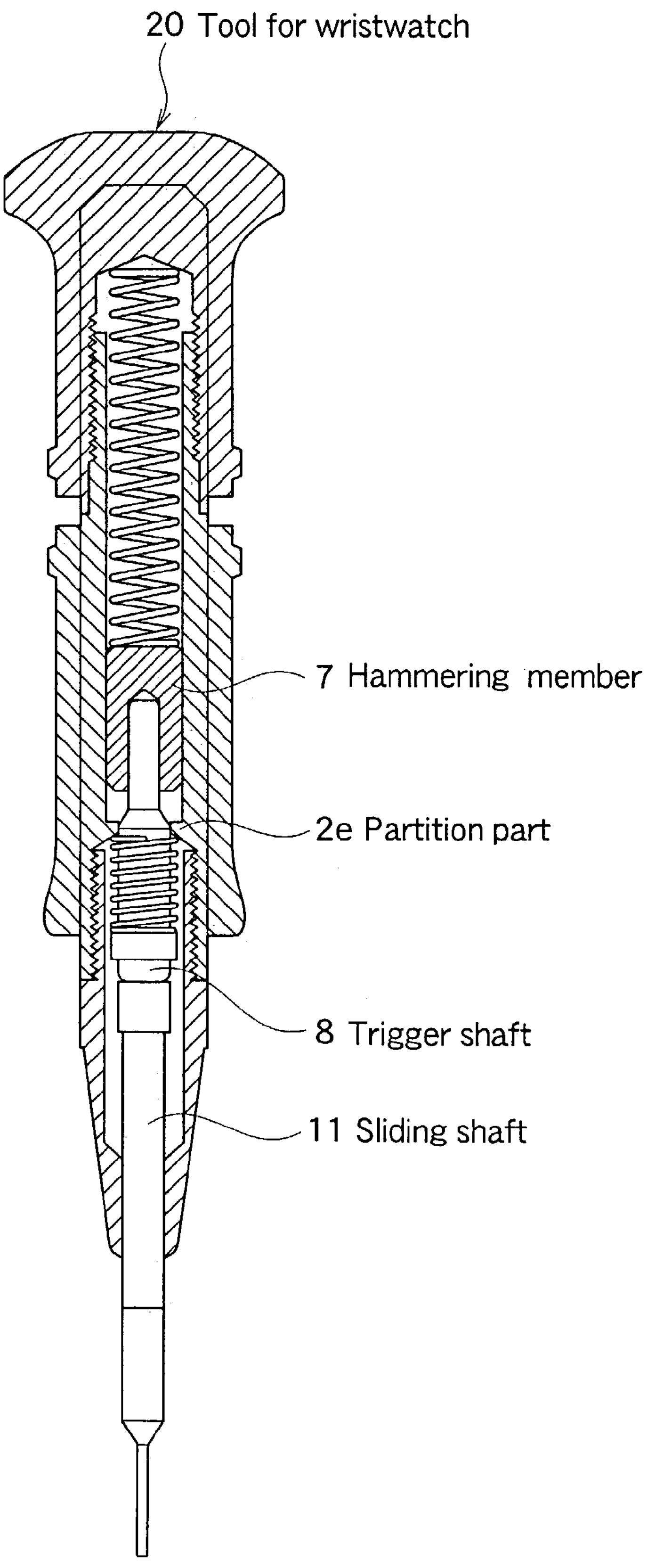
FIG. 5 is a sectional view explaining a further operating condition of the above tool for wristwatch.

The first embodiment of the present invention will now be described with reference to drawings FIG. 1 is an exploded sectional view of a tool for removing a band connecting pin, which is a first form of tool for wristwatch according to the present invention. FIG. 2 is a sectional view of the above tool for wristwatch after assembly. FIGS. 3 to 5 are sectional views explaining operating conditions of the above tool for wristwatch.

The construction of the first form of tool for wristwatch according to the present invention will now be described. Referring to FIG. 1, numeral 20 generally denotes one form of tool for wristwatch according to the present invention.

As shown in FIG. 1, the tool for wristwatch 20 at its upper end portion includes substantially cylindrical head part tube body 1 having its one end closed. The inner wall of the head part tube body 1 is provided with inside threaded part 1*a*. Moreover, at the lower part of this head part tube body 1, substantially cylindrical center tube body 2 is coupled with this head part tube body 1 by engaging the outside threaded part 2*a*, which is provided on an outer periphery of upper end portion of the center tube body 2, with the inside threaded part 1*a* of the head part tube body 1.

Furthermore, at the lower end portion of the center tube body 2, inside threaded part 2*b* is formed and this inside threaded part 2*b* is adapted to engage outside threaded part 4*a* provided on an outer periphery of tip tube body 4 as described later. Further, at the center tube body 2, a through hole 2*c* is formed. At the lower portion of this through hole 2*c*, a partition part 2*e* is formed and this partition part 2*e* is provided with small-diameter hole 2*d* whose diameter is smaller than that of the through hole 2*c*. This partition part 2*e* is provided with slant face part 2*f* extending from the small-diameter hole 2*d* of the partition part 2*e* to the inner wall provided with the inside threaded part 2*b*.

Holding tube body 3 is constructed by threadedly engaging the head part tube body 1 and the center tube body 2. The holding tube body 3 is preferably coated with a resin so as to facilitate holding thereof.

At the lower portion of the holding tube body 3, namely, at the lower portion of the center tube body 2, substantially cylindrical tip tube body 4 having tapered outline is secured by engaging the outside threaded part 4*a* provided on an outer periphery of upper end portion of the tip tube body 4 with the inside threaded part 2*b* provided at the lower end portion of the center tube body 2.

In addition, at the center of the tip tube body 4, a through hole 4*b* is formed and this through hole 4*b* is so formed that it is continuous to small-diameter hole 4*c* formed at the lower end side, namely, tip end side of the tip tube body 4.

Substantially cylindrical tool main body 5 of the tool for wristwatch 20 is constructed by threaded interlock of the holding tube body 3, which consists of the head part tube body 1 and the center tube body 2, with the tip tube body 4.

Further, as shown in FIGS. 1 and 2, in the holding tube body 3, namely, in the through hole 2*c* of the center tube body 2, a compression spring 6 consisting of a compression coil spring and cylindrical hammering member 7 are slidably accommodated between the head part tube body 1 and the partition part 2*e* of the center tube body 2 in such a condition that the hammering member 7 is energized downward by the spring force of the compression spring 6. In this condition, the outside diameter of the hammering member 7 is larger than the inside diameter of the partition part 2*e* of the center tube body 2, so that the hammering member 7 is locked by the partition part 2*e* of the center tube body 2.

This hammering member 7 is substantially in the form of cylinder having a bottom, and at the center thereof, a center hole 7*a* which is a non-through hole is formed. As described later, small-diameter part 8*a* provided at an upper end portion of trigger shaft 8 can be inserted in the center hole 7*a*.

Still further, as shown in FIGS. 1 and 2, between the center tube body 2 and the tip tube body 4, namely, inside the through hole 4*b* of the tip tube body 4, a trigger member 10, which is constructed by assembling a trigger shaft 8 and a deformed coil spring 9, and a sliding shaft 11 are accommodated.

That is to say, a small-diameter part 8*a*, which can be inserted in the center hole 7*a* of the hammering member 7 with a sufficient clearance, is formed at the upper end portion of the trigger shaft 8. This small-diameter part 8*a* is so formed as to continue to a large-diameter part 8*c* through slant face 8*b*. Further, at the lower end side of the large-diameter part 8*c*, a collar part 8*d* is formed. This large-diameter part 8*c* is so constructed as to be insertable in the small-diameter hole 2*d* of the center tube body 2.

On the other hand, with respect to the deformed coil spring 9, as shown in FIGS. 1 and 2, some turns of the spring member coils at lower end 9*a* thereof have inside diameters which are smaller than the diameter of the large-diameter part 8*c* of the trigger shaft 8. Moreover, the center axis of the deformed coil spring 9 is largely curved (biased) at the lower end 9*a* thereof. The deformed (oil spring 9 is inserted into the large-diameter part 8*c* of the trigger shaft 8 from the lower end 9*a* of the deformed coil spring 9 so that it is wound around the large-diameter part 8*c* to be incorporated with the collar part 8*d*.

At the upper end of the sliding shaft 11 a large-diameter head part 11*a* is formed. Further, at the lower end (tip) portion of the sliding shaft 11, a small-diameter engagement part 11*b*, to which wristwatch tool components can be replaceably fixed, is formed.

The trigger member 10, which is constructed by assembling the trigger shaft 8 and the deformed coil spring 9, and the sliding shaft 11 are accommodated in the inside wall of the tip tube body 4, namely, in the through hole 4*b* of the tip tube body 4 in such a condition that a sufficient clearance is provided therebetween.

That is to say, the sliding shaft 11 is mounted in such a condition that the small-diameter engagement part 11*b* thereof passes through the small-diameter hole 4*c* of the tip tube body 4 and protrudes therefrom in a loosely-fitting fashion. However, the head part 11*a* of the sliding shaft 11 has a diameter larger than that of the small-diameter hole 4*c* of the tip tube body 4 so that the sliding shaft 11 may not fall out from the small-diameter hole 4*c* of the tip tube body 4.

In this condition, the trigger member 10 is disposed in the space between the head part 11*a* of the sliding shaft 11 and the partition part 2*e* of the center tube body 2 and is arranged in such a condition that the lower end of the trigger shaft 8 of the trigger member 10 abuts to the head part 11*a* of the sliding shaft 11 and the upper end of the deformed coil spring 9 abuts to the partition part 2*e* of the center tube body 2.

As a result, as shown in FIG. 2, the trigger shaft 8 is energized toward the sliding shaft 11 in a manner such that the small-diameter part 8*a* of the upper end portion of the trigger shaft 8 shifts toward the inside wall of the tool main body 5, namely, the trigger shaft 8 slants by virtue of the spring force of the deformed coil spring 9 and by virtue of the marked curving (biasing) at lower end 9*a* of the center axis of the deformed coil spring 9.

Moreover, a removing pin 12, which is a tool for removing a band connecting pin, is fixed to the engagement part 11*b* of the sliding shaft 11 by inserting the engagement part 11*b* into a lock hole 12*a* under pressure. The removing pin 12 has a straight pin part 12*c* which can be inserted in a band connecting pin insertion hole of watchband.

In this case, the material for the straight part 12*c* of this removing pin 12 is not particularly limited, and as for this material, common tool steels such as carbon tool steels (SK2M, SK3M, SK4M, SK5M and SK6M defined in Japanese Industrial Standard (JIS)) and alloy tool steels (SKS2M, SKS5M, SKS51M and SKS7M defined in Japanese Industrial Standard (JIS)) having been subjected to heat treatment can be used. In addition, the straight part 12*c* is preferably such that it can be easily restored to the original form without suffering bending or breakage in the operation for removing or adjusting a band connecting pin of watchband. Therefore, it is preferred that the material for the straight part 12*c* of the removing pin 12 consist of a super-elastic material. Such a super-elastic material is preferably a super-elastic metallic material consisting of an alloy which contains nickel/titanium (Ni—Ti) or nickel/titanium/cobalt (Ni—Ti—Co) as a principal component.

For example, the material for the straight part 12*c* can be at least one alloy selected from the group consisting of Ni—Ti, Ni—Ti—Cu, Ni—Ti—Fe, Ni—Ti—Nb, Ni—Ti—Zr, Ni—Ti—Hf, Cu—Zn, Cu—Zn—Al, Cu—Zn—Si, Cu—Au—Zn, Cu—Al, Cu—Al—Ni, Fe—Ni—Al, Fe—Ni—Al—Ti, Fe—Ni—Co—Ti, Fe—Mn—Si, Ag—Cd, Au—Cd, Cu—Sn, Cu—Au—Zn, Cu—Zn—Be, Cu—Zn, Ni—Al and Fe—Mn—Si—Cr—Ni.

More specifically, as the material for the straight part 12*c*, for example, Ni—Ti composed of 50% by weight of Ni and 50% by weight of Ti, or Ni—Ti composed of 40% by weight of Ni and 60% by weight of Ti can be used. In particular, these super-elastic metallic materials are suitable for use in removing pin 12 whose straight part 12*c* is long.

Now, the operation of the thus constructed wristwatch tool 20 according to the first embodiment will be described with reference to FIGS. 2 to 5.

Firstly, the center position of the wristwatch tool 20 in the state of FIG. 2 is aligned with the axial center of a wristwatch band connecting pin, not shown, by holding the head part tube body 1 thereof by hand.

Then, as shown in FIG. 3, the tool for wristwatch 20 is pressed in the arrow direction. Consequently, the sliding shaft 11 rises, resisting against the spring force of the deformed coil spring 9. Thus,the head part 11*a* of the sliding shaft 11 thrusts the trigger member 10 upward. However, the deformed coil spring 9 is stopped and compressed by the partition part 2*e*.

On the other hand, the upper end of the small-diameter part 8*a* of the trigger shaft 8, while keeping contact with the slant face 2*f* of the center tube body 2, passes through the small-diameter hole 2*d* and thrusts the hammering member 7 upward. As a result, the compression spring 6 is compressed by the hammering member 7 so that the hammering member 7 is pushed back with large force by the compression spring 6.

When the tool main body 5 of the tool for wristwatch 20 is further pressed in the arrow direction, the slant face part 8*b* of the trigger shaft 8 is finally engaged with the slant face 2*f* of the center tube body 2.

When the tool main body 5 is still further pressed, the slant face 8*b* of the trigger shaft 8 is guided by the slant face 2*f* of the partition part 2*e* by the interaction between the slant face 8*b* of the trigger shaft 8 and the slant face 2*f* of the partition part 2*e*. As a result, the trigger shaft 8 stands erect so that the small-diameter part 8*a* is shifted to the center of the center tube body 2 (see FIG. 3).

When the upper end of the small-diameter part 8*a* of the trigger shaft 8 slides on the lower end surface of the hammering member 7 and the sliding shaft 11 is slid in a predetermined stroke, the compression spring 6 reaches a predetermined compression level. As a result, as shown in FIG. 4, the axial center of the trigger shaft 8 is substantially aligned with the axial center of the tool main body 5. At this stage, the trigger actuation of the trigger member 10 is initiated.

That is, at this stage, the small-diameter part 8*a* and the center hole 7*a* of the hammering member 7 align with each other simultaneously with the initiation of fitting of the large-diameter part 8*c* into the small-diameter hole 2*d*. At that moment, the spring force of the compression spring 6 is suddenly released, so that the small-diameter part 8*a* of the trigger shaft 8 is instantaneously fitted in the center hole 7*a* of the strongly pressed hammering member 7. Thus, as shown in FIG. 5, strong impact (hammering force) is exerted on the sliding shaft 11 which is in contact with the trigger shaft 8. In this connection, the length of the small-diameter part 8*a* of the trigger shaft 8 is so set up that the hammering member 7 may not contact with the partition part 2*e* when the small-diameter part 8*a* is fitted in the hammering member 7.

In this arrangement, the spring force of the compression spring 6 disposed in the center tube body 2 and the head part tube body 1 can be adjusted by regulating the length of threaded engagement of the center tube body 2 with the head part tube body 1. Consequently, the magnitude of the above impact can be regulated.

Thereafter, when the pressed tool main body 5 is drawn in the reverse direction; the hammering member 7 is returned until the hammering member 7 is abutted to the partition part 2*e* by the force of the compression spring 6. Further, with respect to the trigger member 10, the trigger shaft 8 is pushed back by the force of the deformed coil spring 9, so that the sliding shaft 11 is also pushed back.

Accordingly, the trigger shaft 8 is drawn off the center hole 7*a* and is biased once more. As a result, the tool for wristwatch 20 returns to the original arrangement as shown in FIG. 2.

In the above first embodiment, the coil spring has been used as the compression spring 6. However, as for the compression spring 6, a leaf spring, a corrugated spring or the like can be also used.

Also, the tool component for removing a band connecting pin is not limited to that shown in FIG. 1. For example, a deformed pin of, for example, elliptic section can be used. The tool component can be replaced by any one of unlimited configuration and usage. The engagement of the tool component with the sliding shaft is not limited to the insertion of the straight shaft in the shaft hole under pressure, and may be accomplished by at least one of fixing of a shaft in a shaft hole by means of a setscrew, engagement of an external thread with an internal thread, interlock of a protrudent part with a recessed part and interlock of a taper shaft with a bearing. Further, if a tool component whose diameter is smaller than that of the small-diameter hole 4_c_ of the tip tube body 4 can be formed, the tool component may be formed uniformly and with the sliding shaft.

The thus constructed tool for wristwatch 20 according to the first embodiment has the following functions and effects.

That is to say, in the tool main body 5 of the wristwatch tool 20, the hammering mechanism consisting of the compression spring 6, the hammering member 7 and the trigger member 10 is provided. Therefore, strong force that cannot be obtained by conventional static pushing can be applied to the tip of the tool for wristwatch 20 which is fitted with the tool component for removing a band connecting pin. As a result, pins can be removed easily, even if it is rusted.

Further, the predetermined compression level of the compression spring 6 can be regulated by changing the length of threaded engagement of the center tube body 2 with the head part tube body 1. Therefore, the magnitude of impact on the tool component for wristwatch can be easily regulated while constantly performing the triggering operation of the trigger member 10 at given stroke of the sliding shaft 11.

Moreover, the trigger shaft 8 is energized to be biased by the deformed coil spring 9, so that, at the initial stage of operation, the hammering member 7 can be thrust upward by the biased trigger shaft 8. After given stroke of the sliding shaft 11, the trigger shaft 8 stands erect by the interaction between the slant face 2_f_ of the partition part 2_e_ of the center tube body 2 and the trigger shaft 8. This functions as a trigger, and the compression spring 6 is released instantly so that the hammering member 7 can be pushed out.

At that time, force of about 15 to 25 times that at the static pushing is instantaneously applied to the tip of the tool for wristwatch 20.

Nextly, the second embodiment of the present invention will be described with reference to drawings.

Figure 6:
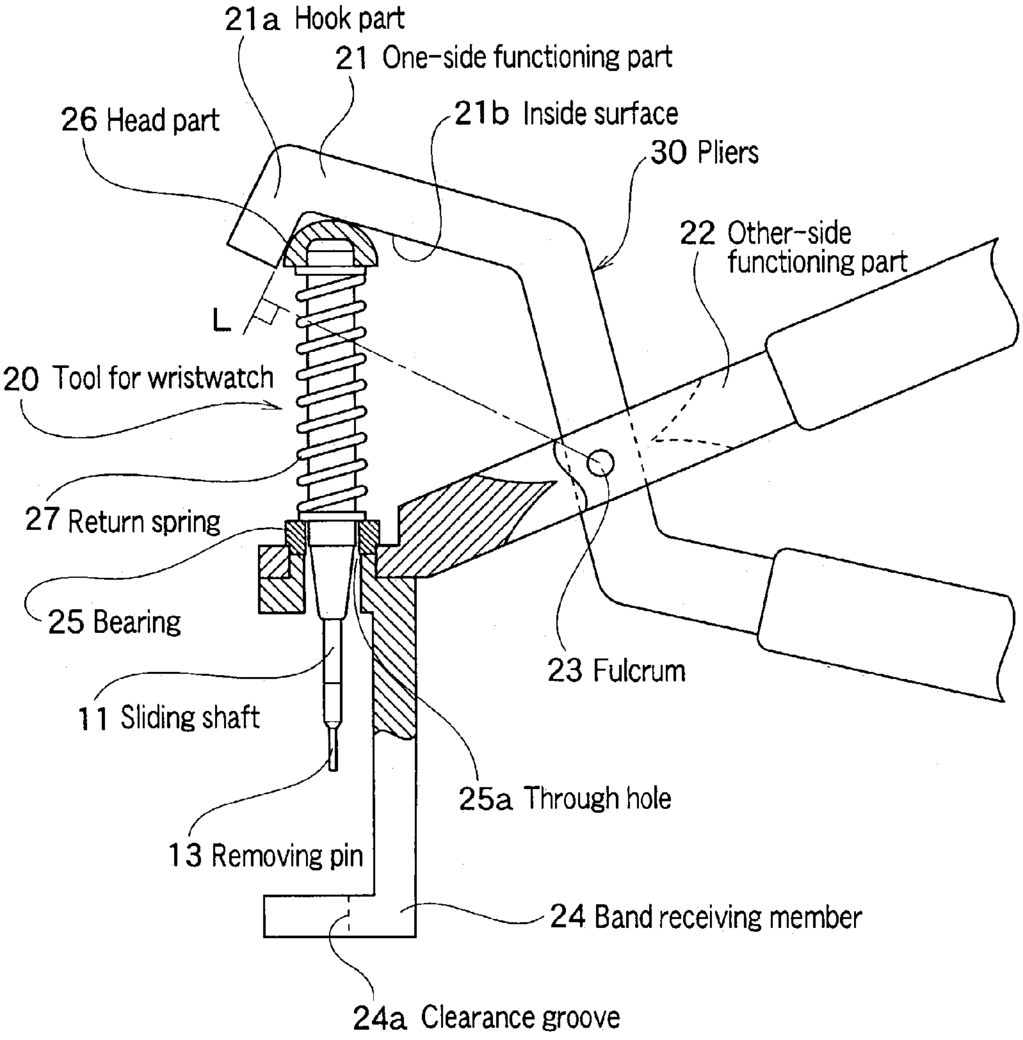
FIG. 6 is a partial sectional side view of a tool for removing a band connecting pin, which is a tool for wristwatch according to a second embodiment of the present invention.

FIG. 6 is a partial sectional side view of a tool for removing a band connecting pin, which is a tool for wristwatch according to the second embodiment of the present invention.

In FIG. 6, numeral 30 denotes pliers. Numeral 21 denotes a one-side functioning part of the pliers, and numeral 22 denotes an other-side functioning part of the pliers. Numeral 23 denotes a fulcrum of both of the functioning parts 21, 22. The front end portion of the one-side functioning part 21 is bent at substantially a right angle so that a hook part 21_a_ is formed. Perpendicular line from the fulcrum 23 crosses on the extension line L of the inside outline of the hook part 21_a_.

Numeral 24 denotes a wristwatch band receiving member as an exterior part fixing jig, which is secured to an outside portion of front end of the other-side functioning part 22. The band receiving member 24 is provided with a through hole 25_a_ which is adapted to pass the below described main body or sliding shaft of wristwatch tool therethrough. Further, the band receiving member 24 is provided with clearance groove 24_a_ for a removed band connecting pin, which is disposed in a neighboring opposite receiving surface on the center axis of the through hole 25_a_.

Numeral 20 denotes a tool for wristwatch of the same construction as in the first embodiment. The tool main body has a substantially cylindrical shape and is not coated with a resin. Numeral 25 denotes a bearing bonded to the front end of the other-side functioning part 22. At the bearing 25, a through hole 25_a_, which is adapted to pass the tool of wristwatch 20 or sliding shaft 11 therethrough, is formed.

The front end of the sliding shaft 11 is replaceably fitted with removing pin 13, which is a tool component for removing a band connecting pin. Numeral 26 denotes a head part secured to the rear end of the tool for wristwatch 20 or formed as a unified part of tool main body. The head part 26 is engaged with the inside surface 21_b_ of the one-side functioning part 21. Numeral 27 denotes a return spring consisting of a compression coil spring, which is inserted in the tool for wristwatch 20 between the head part 26 of the tool for wristwatch 20 and the bearing 25. The return spring 27 energizes the head part 26 toward the one-side functioning part 21.

The upper limit of the open angle of the pliers 30 is regulated by the hook part 21_a_. The return spring 27 is not limited to the above coil spring, and the position at which the return spring 27 is disposed is not limited as long as it lies between the both of the functioning parts.

Nextly, the operation of the above tool for removing a band connecting pin will be described.

A wristwatch band, not shown, is disposed on the band receiving member 24, and the axial center of the tool for wristwatch 20 and the axial center of a band connecting pin; are positioned so as to align with each other. Thereafter, the handles of the pliers 30 are grasped so that the front ends of the pliers 30 are closed.

The front end inside surface 21_b_ of the one-side functioning part 21 pushes the surface of the head part 26 while sliding thereon. Consequently, the tool 26 for removing a band connecting pin is pushed downward, thereby pushing the band connecting pin.

When grasping of the handles of the pliers 30 is continued, the hammering means is actuated upon passage of predetermined stroke in the manner as described with respect to the operation of the first embodiment, so that strong impact is applied to the band connecting pin.

The thus constructed tool for wristwatch according to the second embodiment exerts the following functions and effects.

The tool for wristwatch 20 can be secured by means of the pliers 30, and the band can be secured by means of the band receiving member 24. The operation for removing a band connecting pin can be performed by one hand and thus the operation can be further facilitated.

The band connecting pin is pushed by large impact strength, so that pins, even if rusted, can be easily pushed out from the band by grasping the pliers 30 with common force.

In addition, the above second embodiment will be applicable to, for example, the operation for removing a case back or a bezel by changing wristwatch tool components and jigs for fixing wristwatch exterior parts (band receiving member).

Nextly, the third embodiment of the present invention will be described with reference to drawings.

Figure 7:
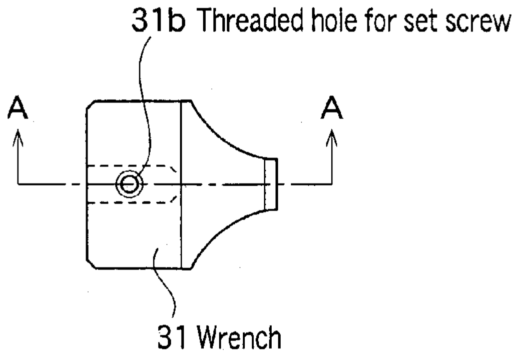
FIG. 7 is a plan view of a tool component for opening a wristwatch case back or bezel according to a third embodiment of the present invention.
Figure 8:
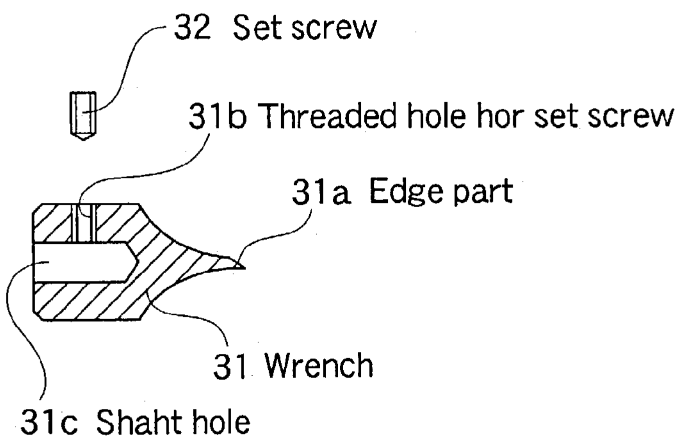
FIG. 8 is a view of a section on the line A—A of FIG. 7.
Figure 9:
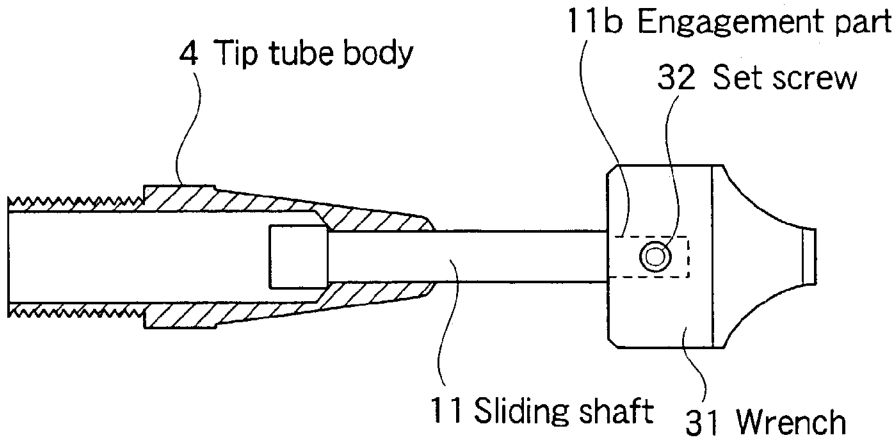
FIG. 9 is a plan view of a tool for opening a case back or bezel, which is fixed to a sliding shaft.

FIG. 7 is a plan view of a tool component for opening a wristwatch case back or bezel according to the third embodiment of the present invention. FIG. 8 is a view of a section on the line A—A of FIG. 7. FIG. 9 is a plan view of a tool for opening a case back or bezel, which is fixed to the sliding shaft.

In FIGS. 7 and 8, numeral 31 denotes a wrench which is a tool component for opening a wristwatch case back or bezel. This wrench is secured to the sliding shaft 11 at the front end of the tool for wristwatch as described in the first embodiment, and provides means for opening a case back or bezel.

Edge part 31*a* of acute angle section is provided at the front end of the wrench 31. Further, a nonthrough shaft hole 31*c*, which is the engagement section with the sliding shaft 11, is formed in the center of the rear end surface of the wrench 31. Moreover, a threaded hole 31*b* for setscrew, for fixing the wrench 31 to the engagement part 11*b* of the sliding shaft 11 extends from the upper surface of the wrench 31 to the shaft hole 31*c*. Numeral 32 denotes a setscrew adapted to engage the threaded hole 31*b* for setscrew.

As shown in FIG. 9, after inserting the sliding shaft 11 in the tip tube body 4, the wrench 31 is fixed to the engagement part 11*b* of the sliding shaft 11 by means of the setscrew 32.

The thus constructed tool for wristwatch according to the third embodiment exerts the following functions and effects.

The wrench 31 is fixed to the sliding shaft 11 of the same tool fro wristwatch has in the first embodiment. Therefore, when a case back of chamfer structure is disassembled from a wristwatch or a bezel is disassembled from a wristwatch case, the edge part 31*a* is engaged with a wrenching point and the main body of tool for wristwatch is pressed. As a result, even if it is the case back or bezel which were rusted and secured firmly and it is pressed by the same force as usual, large impulse can be exerted to the wrench 31. Therefore, even if the case back is rusted, it can be opened easily.

This tool for wristwatch can also be applied to, for example, the disassembly of register rings in the same manner.

Nextly, the fourth embodiment of the present invention will be described with reference to drawings.

Figure 10:
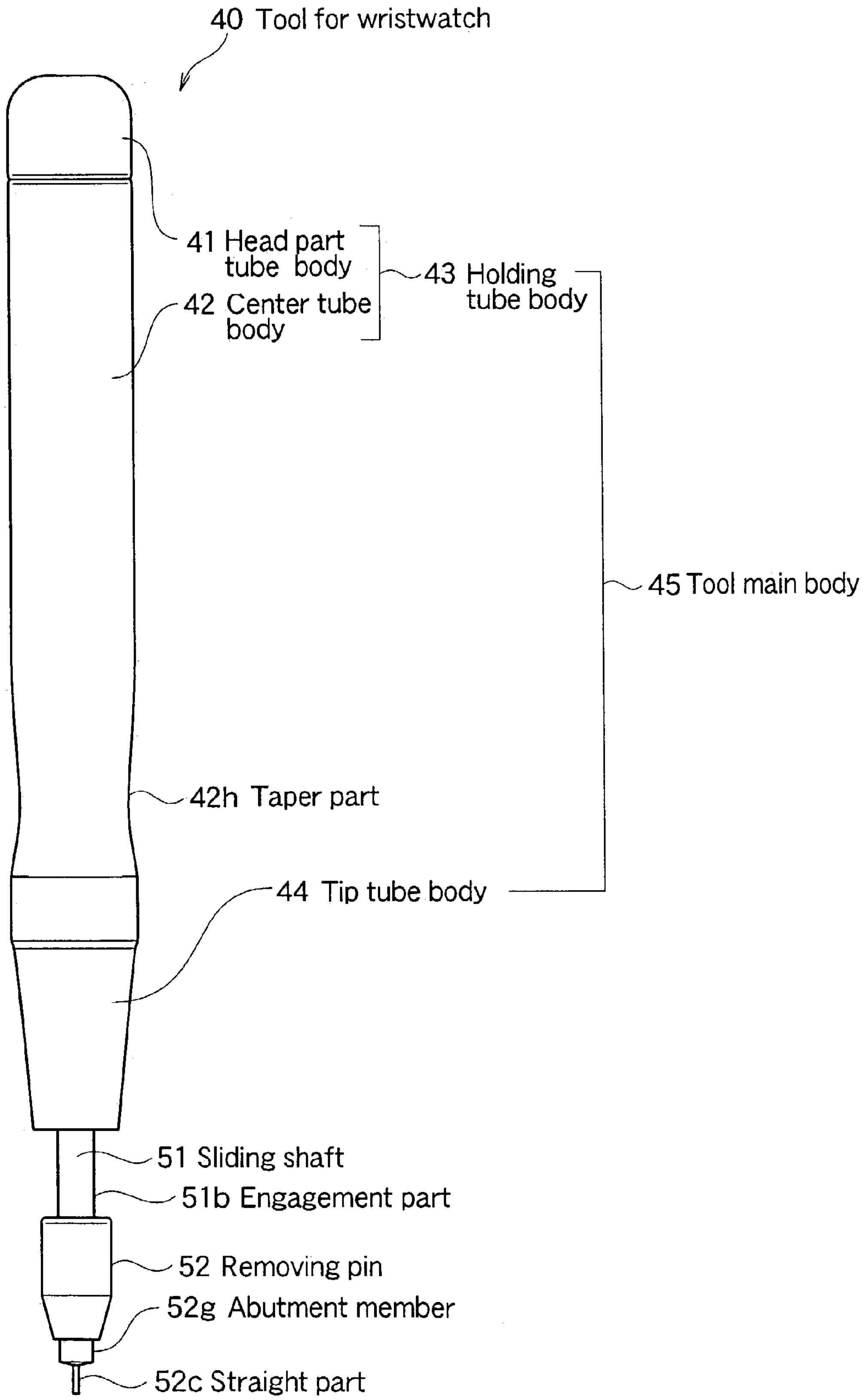
FIG. 10 is a front view of a tool for removing a band connecting pin, which is a fourth form of tool for wristwatch according to the present invention.
Figure 11:
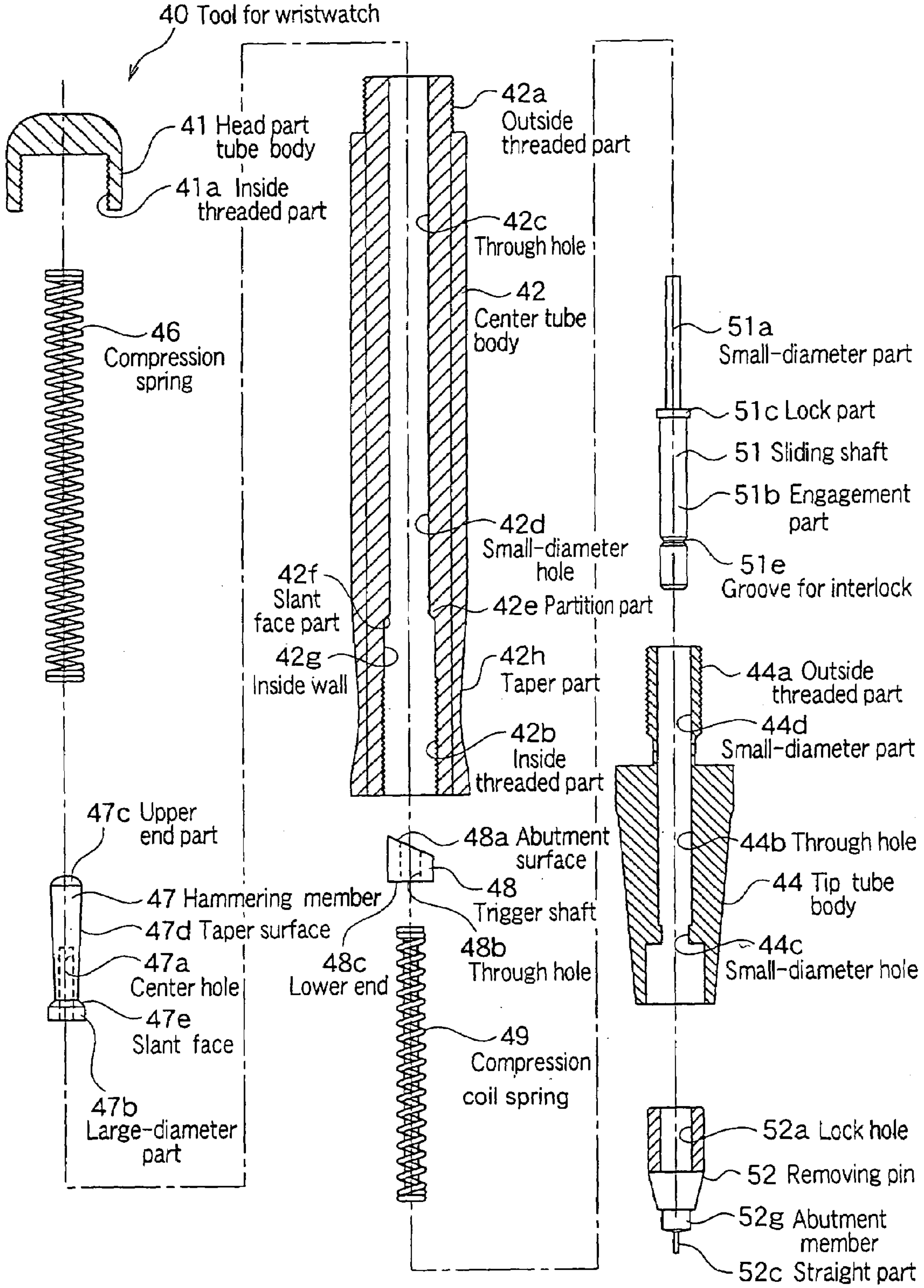
FIG. 11 is an exploded sectional view of the tool for wristwatch shown in FIG. 10.
Figure 14:
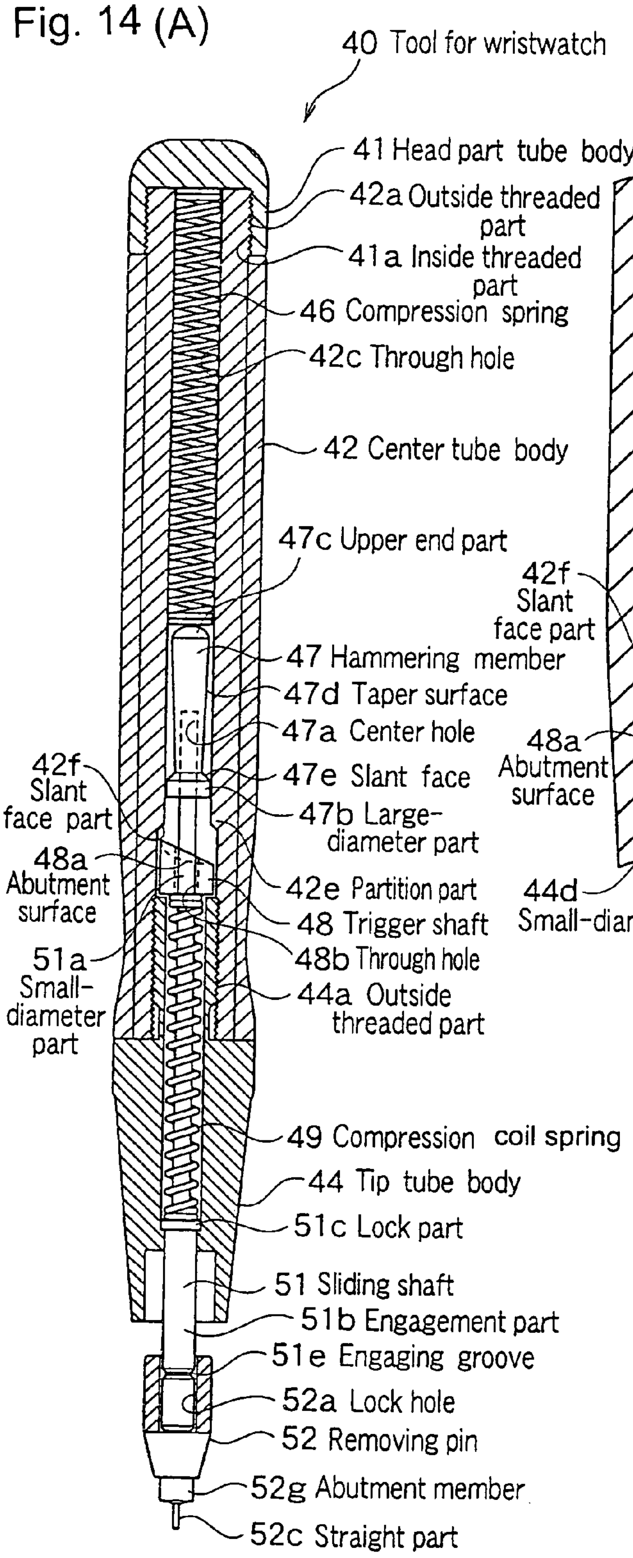
FIG. 14(A) is a sectional view explaining a further operating condition of the above tool for wristwatch.
FIG. 14(B) is an enlarged fragmentary view of the hammering member of the tool of FIG. 14(A).
Figure 14B:
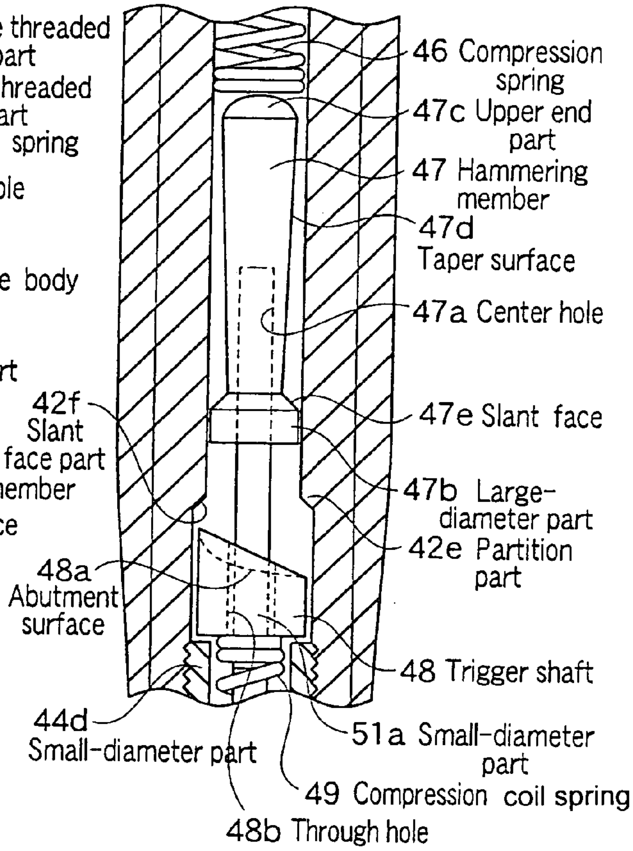
Figure 15:
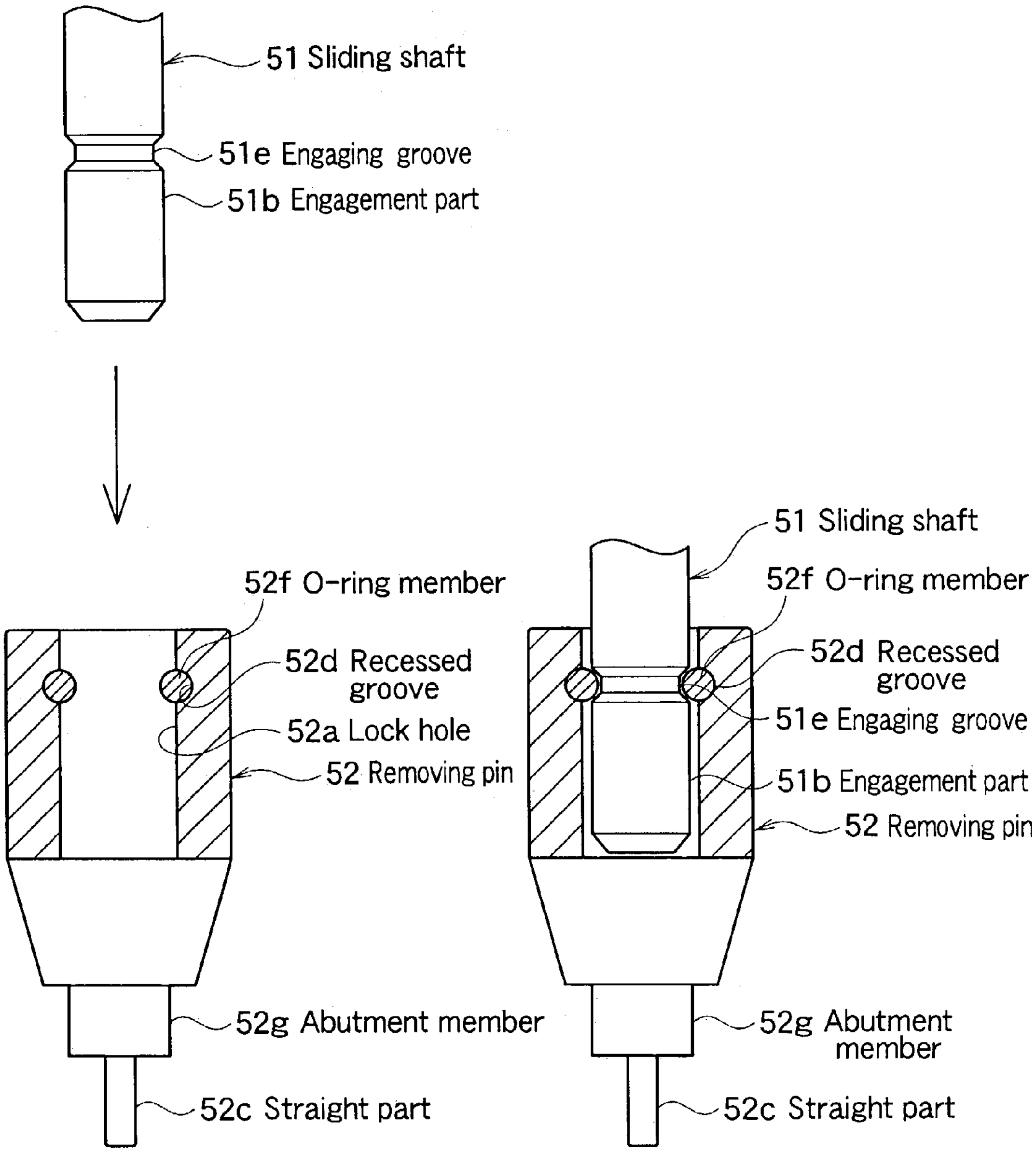
FIG. 15 is a partial enlarged sectional view explaining the manner of removing or fitting of a removing pin detachably fitted to the tool for wristwatch shown in FIG. 10.

FIG. 10 is a front view of a tool for removing a band connecting pin, which is a fourth form of tool for wristwatch according to the present invention. FIG. 11 is an exploded sectional view of the tool for wristwatch shown in FIG. 10. FIGS. 12 to 14 are sectional views explaining operating conditions of the above tool for wristwatch. FIG. 15 is a partial enlarged sectional view explaining the manner of removing or fitting of a removing pin detachably fitted to the tool for wristwatch shown in FIG. 10.

In FIGS. 10 and 11, numeral 40 generally denotes the fourth form of tool for wristwatch according to the present invention.

As shown in FIGS. 10 and 11, at the upper end of the tool for wristwatch 40, substantially cylindrical head part tube body 41, of which one end is closed, is provided. The inner wall of the head part tube body 41 is provided with inside threaded part 41*a*. At the lower part of the head part tube body 41, substantially cylindrical center tube body 42 is fitted by engaging an outside threaded part 42*a* provided on an outer periphery of upper end portion of the center tube body 42 with the inside threaded part 41*a* of the head part tube body 41.

At the lower end portion of the center tube body 42, an inside threaded part 42*b*, which is adapted to engage outside threaded part 44*a* provided on an outer periphery of a tip tube body 44 as described later is formed. Further, at the center of the center tube body 42 a through hole 42*c* is formed. At the lower portion of this through hole 42*c*, a partition part 42*e* having a small-diameter hole 42*d* whose diameter is smaller than that of the through hole 42*c* is provided. This partition part 42*e* is provided with slant face part 42*f*, which is extending from the small-diameter hole 42*d* of the partition part 42*e* to the inner wall 42*g* provided with the inside threaded part 42*b*.

Holding tube body 43 is constructed by threadedly engaging the head part tube body 41 with the center tube body 42.

At the lower end portion of the center tube body 42, a holding taper part 42*h* having its diameter decreased so as to facilitate holding at the time of holding by hand.

At the lower portion of the holding tube body 43, namely, at the lower portion of the center tube body 42, is coupled with substantially cylindrical tip tube body 44 having taper outline is secured by engaging outside threaded part 44*a* provided on the outer periphery of small-diameter part 44*d* at an upper end portion of the tip tube body 44 with the inside threaded part 42*b* provided at the lower end portion of the center tube body 42.

At the center of the tip tube body 44, a through hole 44*b* is formed. The through hole 44*b* is so formed that it is continuous to small-diameter hole 44*c* formed at the lower end side, namely, tip end side of the tip tube body 44.

Substantially cylindrical tool main body 45 of the tool for wristwatch 40 is constructed by threadedly engaging the holding tube body 43, which consists of the head part tube body 41 and the center tube body 42, with the tip-tube body 44.

Figure 12A:
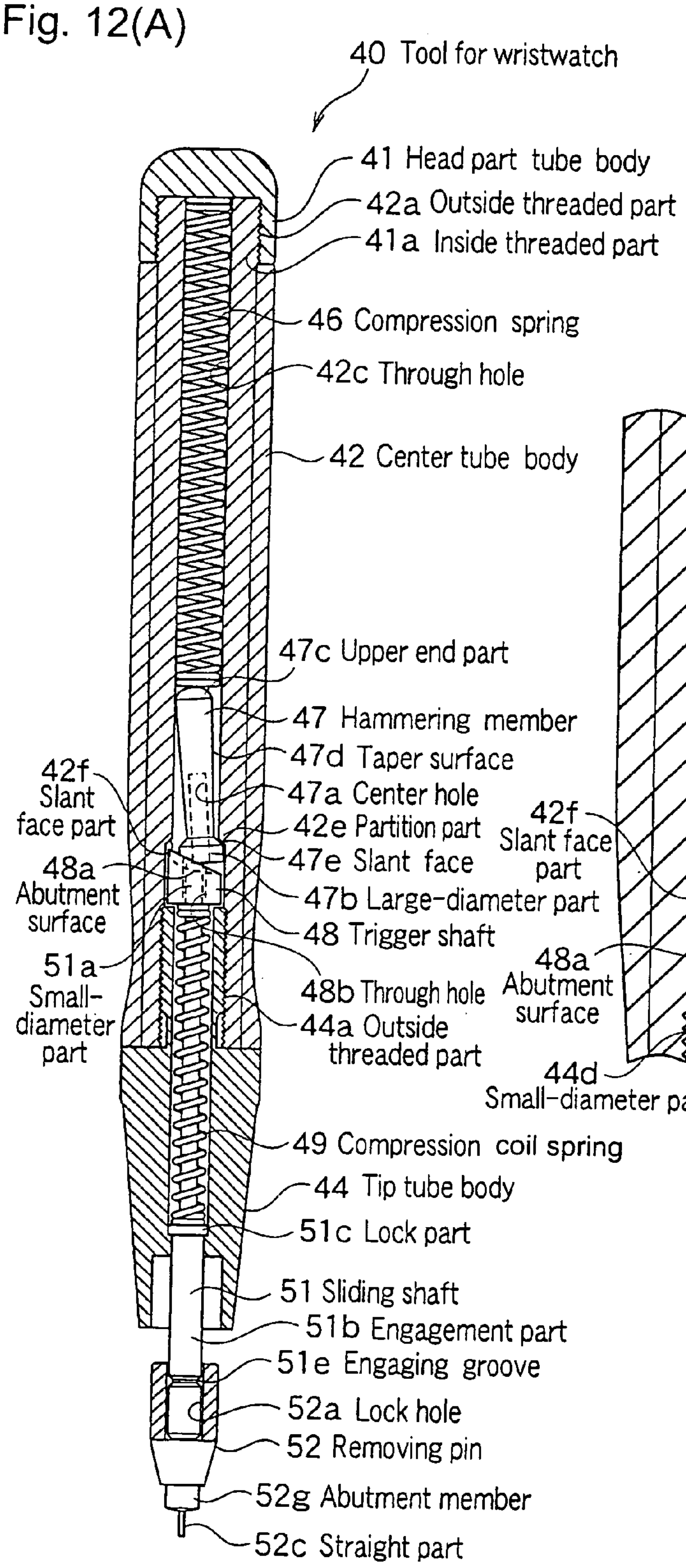
FIG. 12(A) is a sectional view explaining an operating condition of the above tool for wristwatch.
Figure 12B:
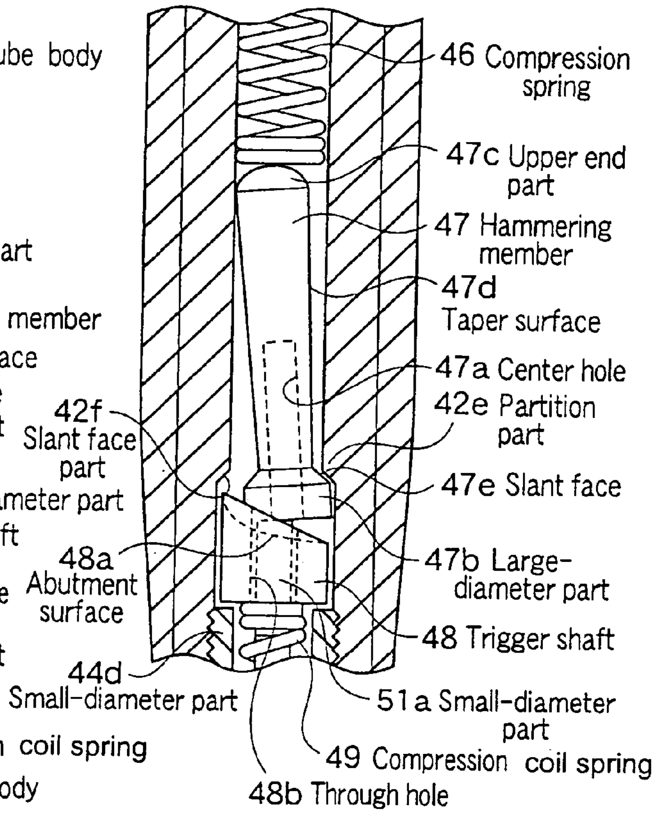
FIG. 12(B) is an enlarged fragmentary view of the hammering member of the tool of FIG. 12(A).

Further, as shown in FIGS. 10 and 12(A)–12(B), a compression spring 46 consisting of a compression coil spring and a substantially cylindrical hammering member 47 are slidably accommodated inside the holding tube body 43, namely, inside the through hole 42*c* of the center tube body 42, in such a condition that the hammering member 47 is energized downward by the spring force of the compression spring 46.

This hammering member 47 is substantially in the form of a bottomed cylinder, and, at its center, has a center hole 47*a* which is a nonthrough hole. As described later, small-diameter part 51*a* of an upper portion of sliding shaft 51 can be inserted in the center hole 47*a*.

At the lower end of the hammering member 47, a large-diameter part 47*b* is formed, and at the upper end of the hammering member 47, an upper end part 47*c* having substantially the shape of a dome is formed. The hammering member 47 has a tapered surface 47*d* whose diameter is gradually decreased from the upper end part 47*c* toward the large-diameter part 47*b*. The hammering member 47 is so formed that it is continuous from the lower end of the tapered surface 47*d* through slant face 47*e* to the large-diameter part 4*b*.

Trigger shaft 48 is disposed between-the center tube body 42 and the tip tube body 44, namely, inside of the inner wall 42*g* of the through hole 42*c* under the partition part 42*e* of the center tube body 42.

This trigger shaft 48 is substantially cylindrical, and at the upper end portion thereof, abutment surface 48*a* having the shape of a slant cone is formed. Further, at the center portion of the trigger shaft 48, a vertical through hole 48*b* is formed. As described later, small-diameter part 51*a* of an upper portion of sliding shaft 51 can pass through the through hole 48*b*.

Moreover, under the trigger shaft 48, sliding shaft 51 is disposed. At the upper portion of the sliding shaft 51, small-diameter part 51*a* is formed. In addition, at the lower portion (front end portion) of the sliding shaft 51, large-diameter engagement part 51*b*, to which wristwatch tool components can be replaceably fixed is provided. Lock part 51*c* whose diameter is larger than that of the engagement part 51*b* is provided in the middle of the sliding shaft 51.

Furthermore, a compression coil spring 49 is interposed between the lower end 48*c* of the trigger shaft 48 and the lock part 51*c* of the sliding shaft 51. The tool for wristwatch is so constructed that the trigger shaft 48 is energized upward by the spring force of the compression coil spring 49. As a result abutment surface 48*a* having a slant cone shape, which is provided at the upper end of the trigger shaft 48, abuts the large-diameter part 47*b* provided at the lower part of the hammering member 47.

As a result, as shown in FIGS. 12(A)–12(B), the hammering member 47 is energized downward by the spring force of the compression spring 46, so that one end portion 47*f* of the large-diameter part 47*b* of the lower end of the hammering member 47 is guided by the abutment surface 48*a* having the shape of a slant cone, which is provided at the upper end of the trigger shaft 48, and one end 47*g* of the slant face 47*e* of the hammering member 47 is guided by the slant face part 42*f* of the partition part 42*e*. Therefore, the axial center of the hammering member 47 is biased toward the inner wall 42*g*.

Furthermore, the sliding shaft 51 is so mounted that the sliding shaft 51 is energized downward by the spring force of the compression coil spring 49 to thereby cause the engagement part 51*b* of the sliding shaft 51 to pass through the small-diameter hole 44*c* of the tip tube body 44 and protrude loosely therefrom. However, since the lock part 51*c* of the sliding shaft 51 has a diameter larger than that of the small-diameter hole 44*c* of the tip tube body 44, the sliding shaft 51 may not fall out from the small-diameter hole 44*c* of the tip tube body 44.

In this construction, the spring force of the compression spring 46 which energizes the hammering member 47 downward is set for being greater than the spring force of the compression coil spring 49 which energizes the trigger shaft 48 upward. Consequently, as shown in FIGS. 12(A)–12(B), when the tool for wristwatch is not in use, the lower end 48*c* of the trigger shaft 48 is held abutting the small-diameter part 44*d* of the upper end portion of the tip tube body 44.

In this state, as shown in FIGS. 12(A)–12(B), the length of the small-diameter part 51*a* of the upper portion of the sliding shaft 51 is so determined that upper end 51*d* of the small-diameter part 51*a* of the upper portion of the sliding shaft 51 slightly protrudes from the through hole 48*b*.

Furthermore, as shown in FIG. 15, the engagement part 51*b* of the sliding shaft 51 is provided with engaging groove 51*e* for removing pin.

On the other hand, as shown in FIG. 15, at the center of the removing pin 52, which is a tool component for removing a band connecting pin, a lock hole 52*a* is formed. The removing pin 52 further includes straight pin part 52*c* which can be inserted in a band connecting pin insertion hole of watchband. In the interior of the lock hole 52*a*, recessed groove 52*d* is formed. Inside of this recessed groove 52*d*, O-ring member 52*f* consisting of an elastic member such as a rubber, a synthetic resin or the like is disposed.

At the base end of the straight pin part 52*c*, there is provided abutment member 52*g* consisting of a flexible member such as a silicone rubber, a urethane rubber or the like. Accordingly, where a band connecting pin of watchband is removed from the watchband by using the tool for wristwatch 40, even if the removing pin 52 collides with the vicinity of a band connecting pin insertion hole of watchband by impact force, the impact force by the abutment member 52*g* would be reduced. As a result, marring and damaging of the vicinity of the band connecting pin insertion hole of watchband can be effectively prevented.

The removing pin 52 of the above structure, as shown in FIG. 15, is so constructed that, the engagement part 51*b* of the sliding shaft 51 is inserted in the lock hole 52*a* of the removing pin 52. As a result, the O-ring member 52*f*, which is disposed in the recessed groove 52*d* of the lock hole 52*a*, is fitted in the engaging groove 51*e* of the engagement part 51*b* of the sliding shaft 51. Consequently, removing pin 52 can be detachably fitted to the engagement part 51*b* of the sliding shaft 51.

Figure 16:
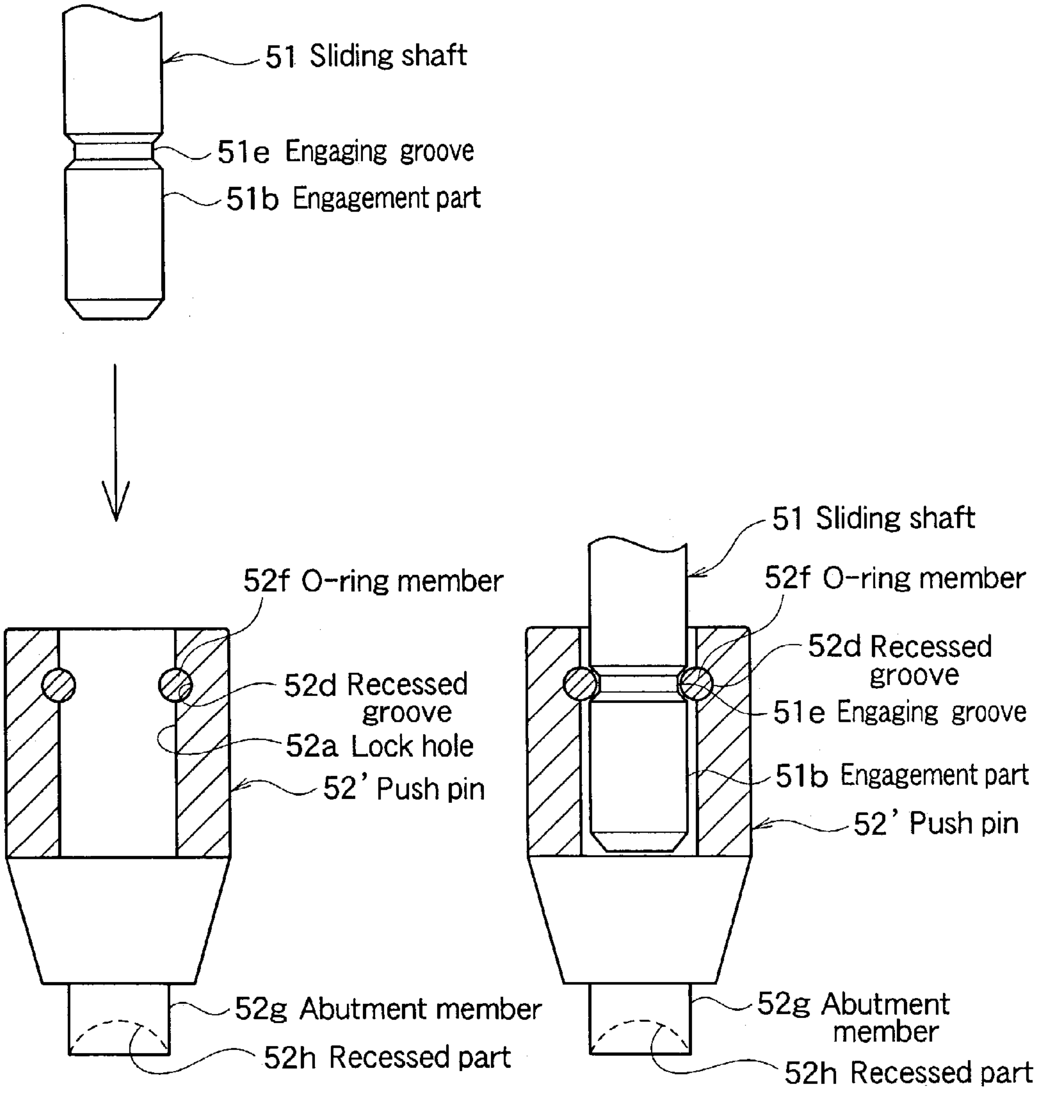
FIG. 16 is a partial enlarged sectional view of a push pin detachably fitted to the tool for wristwatch shown in FIG. 10.

As shown in FIG. 16, push pin 52' may be used in place of the above removing pin 52 so that when the connecting pin having been removed from a band connecting pin insertion hole of watchband is inserted again in a band connecting pin insertion hole, the tool for wristwatch 42 may be used.

Accordingly, as shown in FIG. 16, the push pin 52' is devoid of a part corresponding to the straight pin part 52*c* of removing pin 52 shown in FIG. 15. Instead, at the center of the abutment member 52*g*, a recessed part 52*h* of cone shape to which a connecting pin is contacted is formed. When connecting pin is pushed, the escape of connecting pin can be prevented by this recessed part 52*h* of cone shape.

Figure 17:
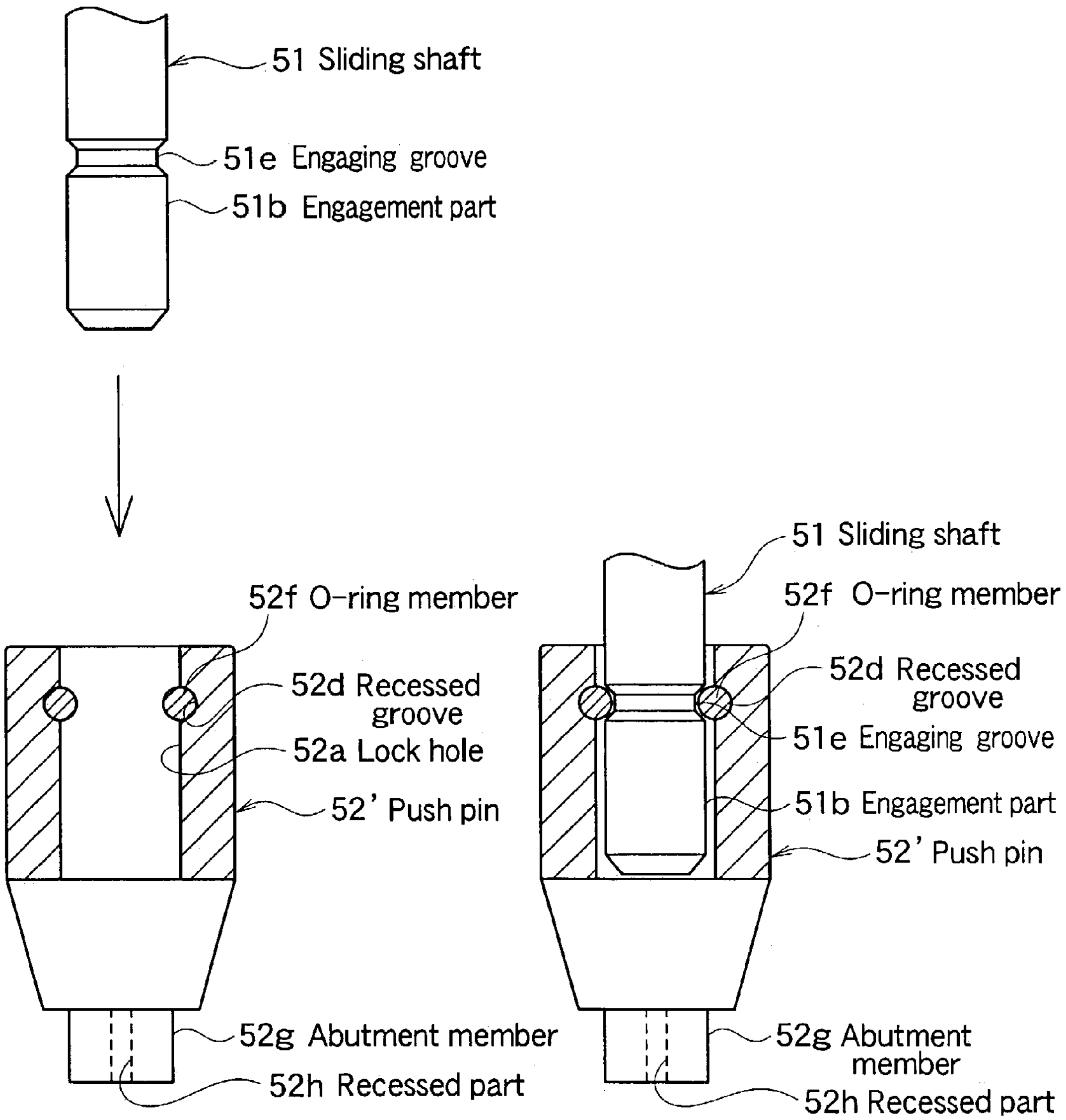
FIG. 17 is a partial enlarged sectional view of a push pin detachably fitted to the tool for wristwatch shown in FIG. 10.

Moreover, as shown in FIG. 17, the push pin 52' is devoid of a part corresponding to the straight pin part 52*c* of removing pin 52 shown in FIG. 15. Instead, at the center of the abutment member 52*g*, a recessed part 52*h* consisting of a blind hole for insertion of a connecting pin may be provided. When a connecting pin is pushed, the escape of connecting pin can be more effectively prevented by this recessed part 52*h* consisting of a blind hole. The recessed part 52*h* of the push pin 52' is especially suitable for fitting, for example, a bridge pin, a pin or a C ring.

The other components are identical with those of the removing pin 52, so that like reference numbers have been assigned to like component members.

The present invention is so constructed that the tool of wristwatch 40 is operated, as described later, by using the above push pin 52' in the state that a connecting pin is connected or fitted in the recessed part 52. As a result, the connecting pin can be inserted in a band connecting pin insertion hole of watchband by the induced impact force.

Nextly, the operation of the thus constructed tool for wristwatch 40 will be described with reference to FIGS. 12 to 14.

First, the head part tube body 41 is held by hand so that the center position of the tool for wristwatch 40 of FIGS. 12(A)–12(B) is aligned with the axial center of a wristwatch band connecting pin (not shown).

Figure 13A:
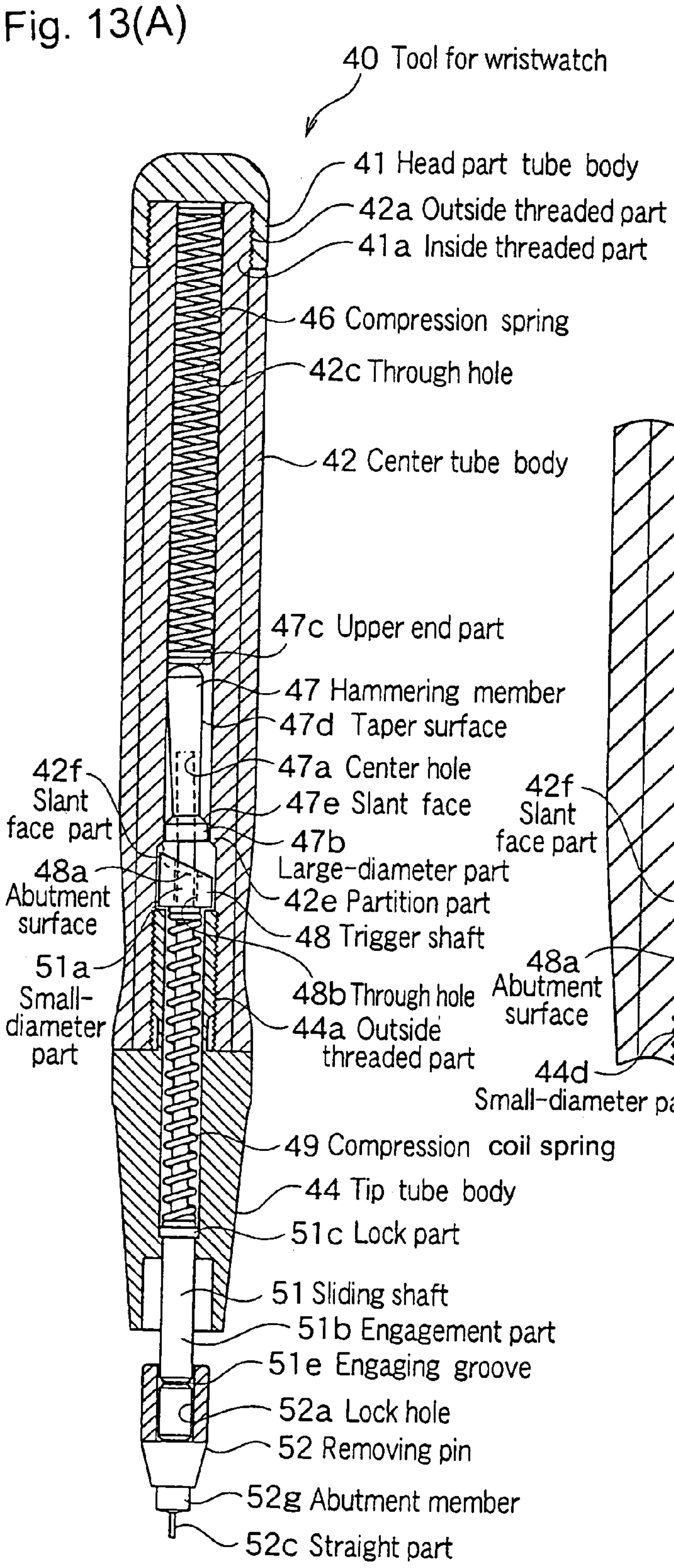
FIG. 13(A) is a sectional view explaining another operating condition of the above tool for wristwatch.
Figure 13B:
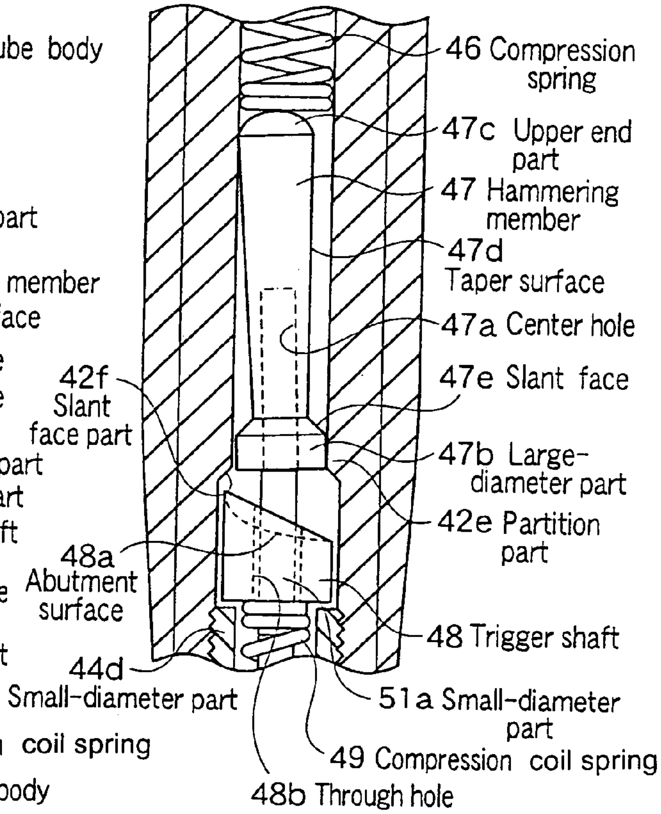
FIG. 13(B) is an enlarged fragmentary view of the hammering member of the tool of FIG. 13(A).

Then, as shown in FIGS. 13(A)–13(B), the tool for wristwatch 40 is pressed in the arrow direction. Consequently, the sliding shaft 51 rises, resisting the spring force of the compression coil spring 49.

In accordance with the rise of the sliding shaft 51, the upper end 51*d* of the small-diameter part 51*a* of the upper portion of the sliding shaft 51 passes through the through hole 48*b* of the trigger shaft 48 and protrudes therefrom. Thus, the upper end 51*d* abuts the one end portion 47*f* of the large-diameter part 47*b* of the lower end of the hammering member 47.

In this state, the axial center of the hammering member 47 is biased toward the inner wall 42*g* as aforementioned, so that the upper end 51*d* of the small-diameter part 51*a* of the sliding shaft 51 is not fitted in the center hole 47*a* of the hammering member 47. Therefore, while the upper end 51*d* of the small-diameter part 51*a* of the sliding shaft 51 abuts the large-diameter part 47*b* of the lower end of the hammering member 47, the hammering member 47 is raised, resisting the compression spring 46.

At this stage, the compression spring 46 and the compression coil spring 49 are compressed, respectively.

Further, in this state, the trigger shaft 48 is energized upward by the spring force of the compression coil spring 49. As a result, the uppermost portion of the conical abutment surface 48*a* of the upper end of the trigger shaft 48 abuts the slant face part 42*f* of the partition part 42*e* so that the trigger shaft 48 can not be moved upward any more.

On the other hand, in accordance with the rise of the sliding shaft 51, the hammering member 47 is further raised, so that the one end 47*g* of the slant face 47*e* of the hammering member 47 is guided by the slant face part 42*f* of the partition part 42*e*. As a result, the hammering member 47 is gradually departed from the inner wall 42*g* to move toward the center, so that the hammering member 47 is thrust upward. Accordingly, the compression spring 46 is compressed by the hammering member 47 so that the hammering member 47 is pushed back with large force.

When the tool main body 45 of the tool for wristwatch 40 is pressed further, in the arrow direction, the upper end 51*d* of the small-diameter part 51*a* of the sliding shaft 51 is protruded from the through hole 48*b* of the trigger shaft 48, so that the hammering member 47 is pushed upward. Accordingly, the upper end part 47*c* of hammering member 47 having substantially the shape of a dome is guided along the inner wall of the through hole 42*c* of the center tube body 42. As a result, the axial center of the hammering member 47 is further moved until standing erect so that the axial center of the hammering member 47 is shifted to the center of the center tube body 42 (see FIG. 13).

When the sliding shaft 51 is slid in predetermined stroke, the compression spring 46 reaches a preset compression level. As a result, as shown in FIG. 14, the axial center of the hammering member 47 is substantially aligned with the axial center of the tool main body 45. At this stage, the trigger operation is initiated.

That is, at this stage, the small-diameter part 51*a* of the sliding shaft 51 and the center hole 47*a* of the hammering member 47 align with each other. At that moment, the spring force of the compression spring 46 is suddenly released, so that the small-diameter part 51*a* of the sliding shaft 51 is instantaneously fitted in the center hole 47*a* of the strongly pressed hammering member 47. As a result, as shown in FIG. 15, strong impact (hammering force) is exerted on the sliding shaft 51.

In this arrangement, the spring force of the compression spring 46, which is disposed in the center tube body 42 and the head part tube body 41 can be regulated by changing the length of threaded engagement of the center tube body 42 with the head part tube body 41. Consequently, the magnitude of the above impact can be regulated.

Thereafter, when the pushed tool main body 45 is drawn in the reverse direction, one end portion 47*f* of the large-diameter part 47*b* of the lower end of the hammering member 47 is guided by the abutment surface 48*a* having slant cone shape of the upper end of the trigger shaft 48, by the spring force of the compression spring 46. Further, one end 47*g* of the slant face 47*e* of the hammering member 47 is also guided by the slant face part 42*f* of the partition part 42*e*. Therefore, the axial center of the hammering member 47 is biased toward the inner wall 42*g*. Thus, the hammering member 47 is returned to the original position of FIG. 12.

Further, at this stage, the sliding shaft 51 is energized downward by the spring force of the compression coil spring 49, so that the sliding shaft 51 is pushed back to return to the original position of FIGS. 12(A)–12(B).

In the above fourth embodiment, as in the first embodiment as shown in FIG. 1, the coil spring has been used as the compression spring 6. However, as for the compression spring 6, a leaf spring, a corrugated spring or the like can be also used.

Also, the removing pin 52 as a tool component for removing a band connecting pin is not limited to that shown in FIG. 15. For example, deformed pin of, for example, elliptic section can be used. The tool component can be replaced by any one of unlimited configuration and usage. The engagement of the tool component with the sliding shaft is not limited to the insertion of straight shaft in shaft hole under pressure, and may be accomplished by at least one of fixing of a shaft in a shaft hole by means of a setscrew, engagement of an external thread with an internal thread, engagement of a protrudent part with a recessed part and engagement of a taper shaft with a bearing. Further, if a tool component can be formed in a diameter which is smaller than that of the small-diameter hole 44*c* of the tip tube body 44, the tool component and the sliding shaft 41 may be formed into unified body.

With respect to-the material of the straight pin part 52*c* of the removing pin 52, the straight pin part 52*c* can be constituted of the same material as employed in the first embodiment shown in FIGS. 1 to 5, so that the straight pin part 52*c* can be easily restored to the original form without suffering bending or breakage in the operation for removing or inserting a band connecting pin of watchband or adjusting the same.

In addition, the above tool for wristwatch 40 according to the fourth embodiment can also be used in a manner, not shown, wherein it is secured by means of the pliers 30 as shown in FIG. 6. Further, the tool for wristwatch 40 can be used in combination with the wrench 31 as a tool component for opening a bezel as shown in FIGS. 7 to 9 in place of the removing pin 52.

The thus constructed tool for wristwatch 40 according to the fourth embodiment exerts the following functions and effects.

Namely, in the interior of the tool main body 45 of the tool for wristwatch 40, the hammering means including the compression spring 46, the hammering member 47, the trigger shaft 48, the compression coil spring 49 and the sliding shaft 51 are provided. Therefore, large force that cannot be obtained by the conventional static pushing can be applied to the extreme tip of the tool for wristwatch 40 which is fitted with the tool component for removing a band connecting pin. As a result, pins, even if rusted, can be easily removed.

Further, the preset compression level of the compression spring 46 can be regulated by changing the length of threaded engagement of the center tube body 1 42 with the head part tube body 41. Therefore, while constantly performing the triggering operation of the trigger member 40 is performed constantly at certain stroke of the sliding shaft 41, the magnitude of impact on the tool component for wristwatch can be easily regulated.

Moreover, the trigger shaft 48 is energized so as to be slanted by the deformed coil spring 49. As a result, at the initial stage of operation, the slanted hammering member 47 can be pushed upward by the sliding shaft 51.

By virtue of the interaction between the slant face 47*e* of the hammering member 47 and the slant face part 42*f* of the partition part 42*e* and by virtue of the interaction between the upper end part 47*c* of hammering member 47 having substantially the shape of a dome and the inner wall of the through hole 42*c* of the center tube body 42, after predetermined stroke of the sliding shaft 51, the hammering member 47 stands erect. This becomes a trigger, and the small-diameter part 51*a* of the sliding shaft 51 is instantaneously fitted in the center hole 47*a* of the hammering member 47. Consequently, the compression spring 46 is suddenly released so that the hammering member 47 can be pushed out.

At that time, force of about 15 to 25 times that at the static pushing is instantaneously applied to the extreme tip of the tool for wristwatch 40.

Next, the fifth embodiment of the present invention will be described.

Figure 18:
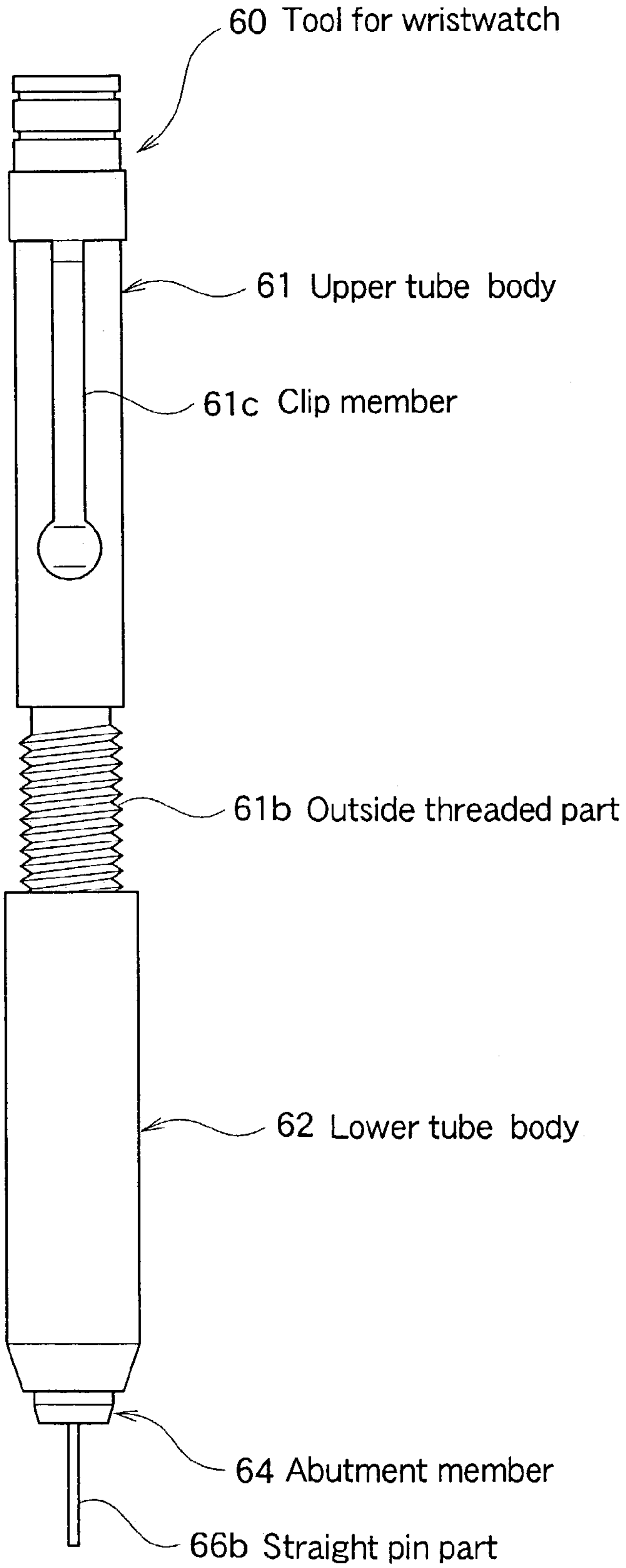
FIG. 18 is a front view of an auxiliary tool for removing a band connecting pin, which is a fifth form of tool for wristwatch according to the present invention.
Figure 19:
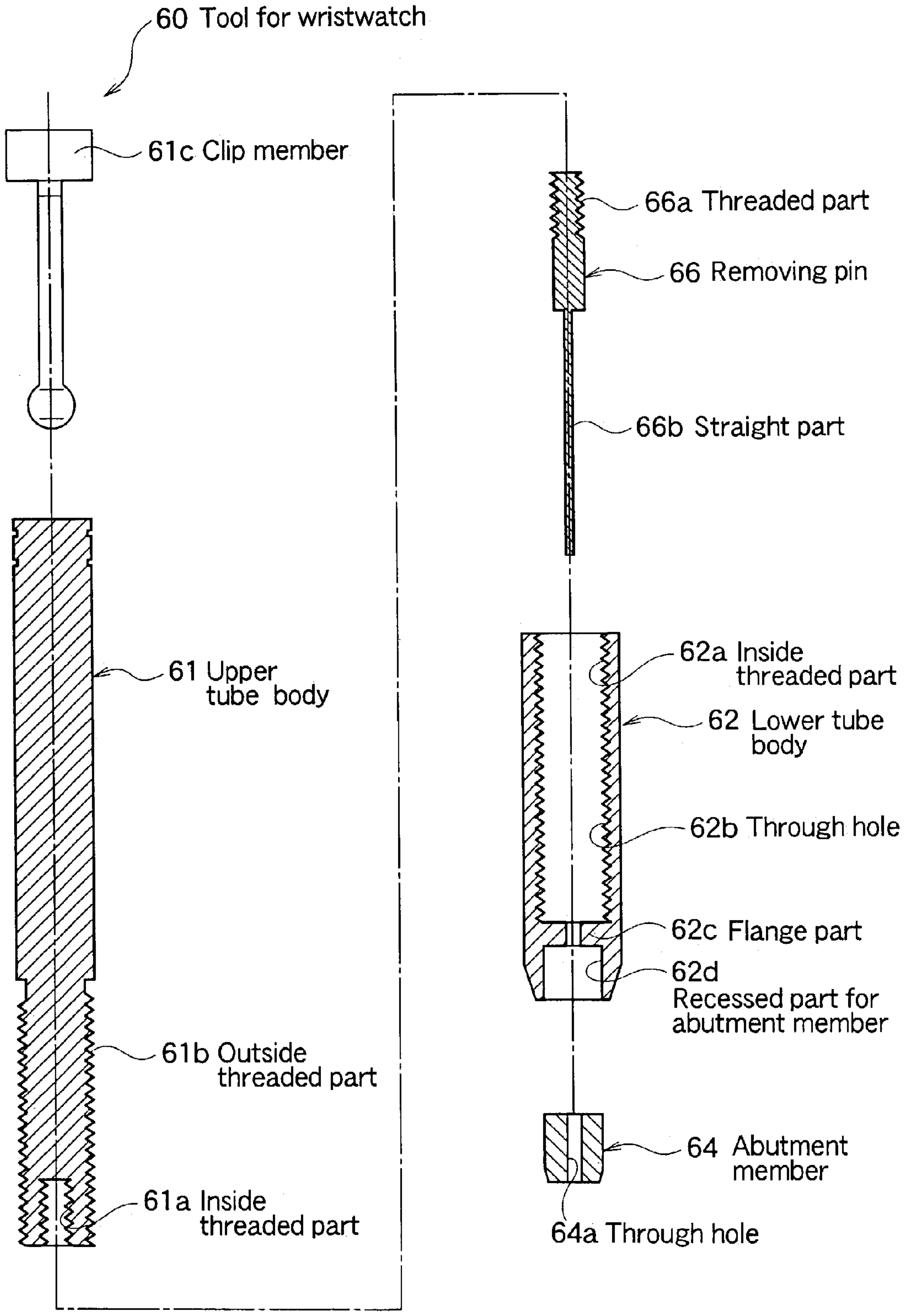
FIG. 19 is an exploded sectional view of the tool for wristwatch shown in FIG. 18.
Figure 20:
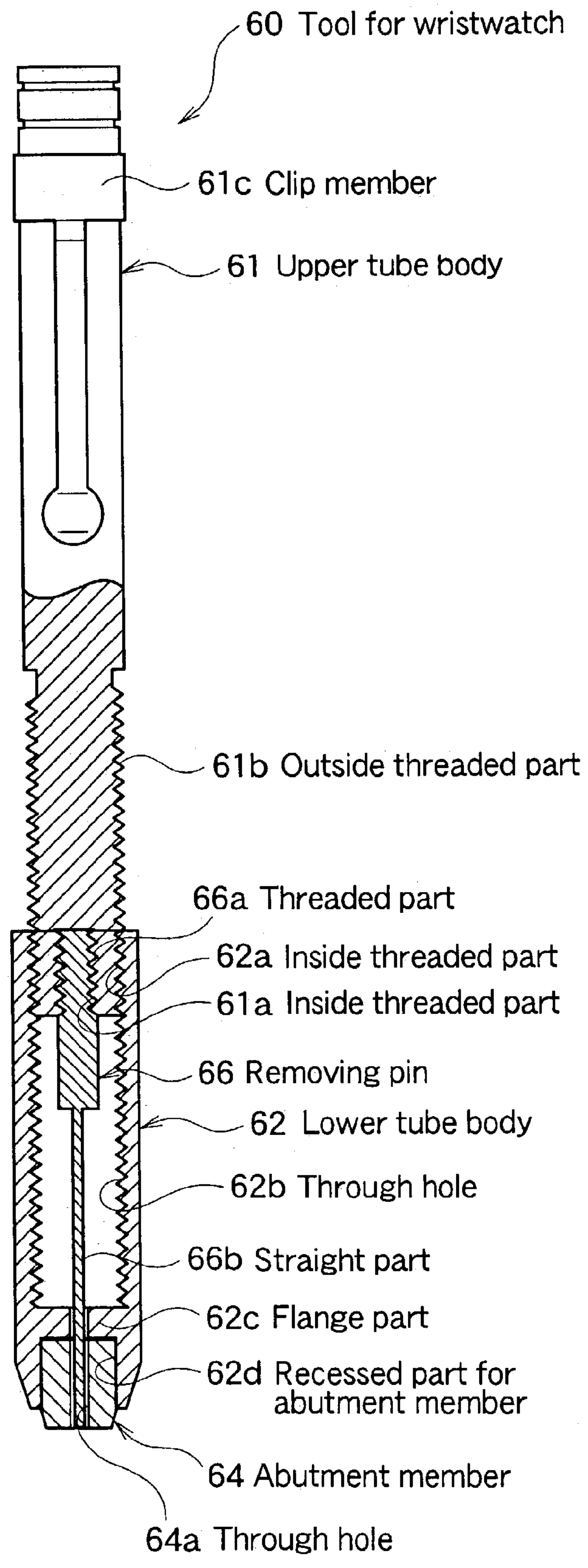
FIG. 20 is a sectional view explaining an operating condition of the above tool for wristwatch.
Figure 21:
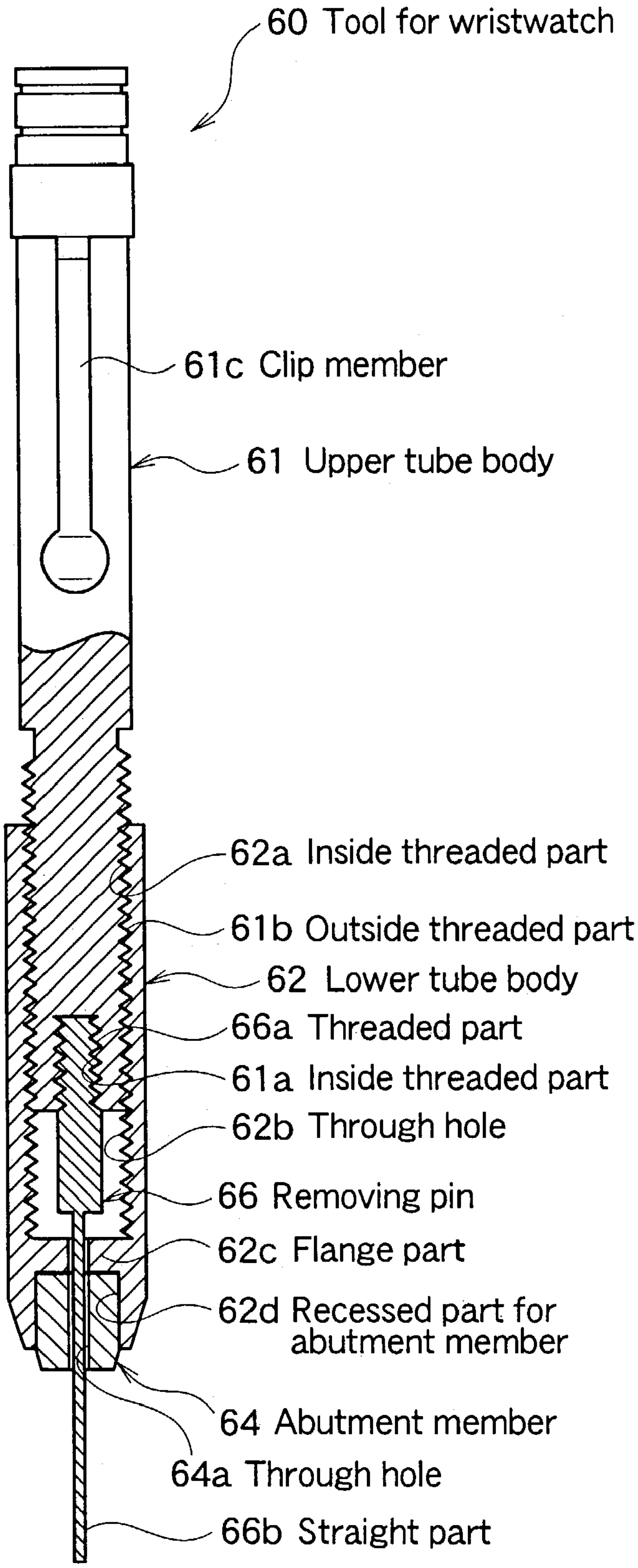
FIG. 21 is a sectional view explaining another operating condition of the above tool for wristwatch.

FIG. 18 is a front view of a tool for removing a band connecting pin, which is a fifth form of tool for wristwatch according to the present invention. FIG. 19 is an exploded sectional view of the tool for wristwatch shown in FIG. 18. FIGS. 20 and 21 are sectional views explaining operating conditions of the above tool for wristwatch.

In FIGS. 18 and 19, numeral 60 generally denotes the fifth form of tool for wristwatch according to the present invention.

As shown in FIGS. 18 and 19, at the upper end portion of the tool for wristwatch 60, substantially cylindrical upper tube body 61 whose one end is closed is provided. At the inner wall of the lower end portion of the upper tube body, an inside threaded part 61*a* is formed. Further, at the outer wall of the upper tube body 61, an outside threaded part 61*b* is formed.

At the lower part of the upper tube body 61, substantially cylindrical lower tube body 62 having a tapered outline is detachably fitted by threadedly engaging inside threaded part 62*a* provided on an inner periphery of the upper end portion of the lower tube body 62 with the outside threaded part 61*b* of the upper tube body 61.

Further, at the center of the lower tube body 62, a through hole 62*b* is formed. In the vicinity of the lower end of this through hole 62*b*, a flange part 62*c* is protruded. This flange part 62*c* forms recessed part 62*d* for abutment member at the lower end of the through hole 62*b*.

The thus formed recessed part 62*d* for abutment member is fitted with abutment member 64 consisting of a flexible member such as, a silicone rubber, a urethane rubber or the like.

Accordingly, where a band connecting pin of watchband is removed from a band connecting pin insertion hole of watchband by using the tool for wristwatch 60, even if the tip of the lower tube body 62 of the tool for wristwatch 60 collides with the vicinity of a band connecting pin insertion hole of watchband by impact force, the impact force would be reduced by the abutment member 64. As a result, marring and damaging of the vicinity of the band connecting pin insertion hole of watchband can be effectively prevented.

Moreover, upper-end threaded part 66*a* of removing pin 66 is detachably engaged with the inside threaded part 61*a* of the upper tube body 61. The tool for wristwatch is so constructed that the relative position between the inside threaded part 62*a* provided on an inner periphery of the upper end portion of the lower tube body 62 and the outside threaded part 61*b* of the upper tube body 61 can be adjusted. As a result, as shown in FIGS. 20 and 21, straight pin part 66*b* of the front end portion of the removing pin 66 can be protruded from through hole 64*a* which is formed at the center of the abutment member 64 of the lower tube body 62. Furthermore the length of the protrusion thereof can be regulated, or the protrusion thereof can be avoided by changing the threaded engagement state.

Moreover, the length of protrusion of straight pin part 66*b* that can be regulated by one turn can be increased, and the speed of regulation can be doubled or trebled, by using a double thread or a triple thread for these threaded parts.

For the ease of carriage, the upper tube body 61 is fitted with clip member 61*c* of the same structure as that of a fountain pen clip whereby the tool for wristwatch can be held on a pocket or the like.

Further, although not shown, it is preferred that the outer surfaces of the above upper tube body 61 and lower tube body 62 should be provided with minute unevenness for non-slip from the viewpoint of easiness in operating the tool for wristwatch by holding the same by hand.

With respect to the material of the straight pin part 66*b* constituting the front end portion of the removing pin 66, the straight pin-part 66*b* can be constituted of the same material as employed in the first embodiment referring to FIGS. 1 to 5, so that the straight pin part 66*b* can be easily restored to the original form without suffering bending or breakage in the operation for inserting a band connecting pin of watch-band or adjusting the same.

Nextly, the operation of the thus constructed tool for wristwatch 60 will be described with reference to FIGS. 20 and 21.

The tool for wristwatch 60 according to this fifth embodiment is fundamentally one used for removing a connecting pin in which a connecting pin is not completely drawn off from a band connecting pin insertion hole of watchband, after the removing operation, by using the tool for wristwatch 20 of the first embodiment as shown in FIGS. 1 to 5, the tool for wristwatch 20 together with pliers according to the second embodiment as shown in FIG. 6, and the tool for wristwatch 40 of the fourth embodiment as shown in FIGS. 10 to 15.

However, where a connecting pin can be removed from a watchband without the need to use the tool for wristwatch 20, 40, the tool for wristwatch 60 can naturally be employed in the removing of connecting pin.

Now, the tool for wristwatch 60 is in its initial condition such that the straight pin part 66*b* of the front end portion of the removing pin 66 is not protruded from the through hole 64*a* (through hole 62*b*) which is provided at the center of the abutment member 64 of the lower tube body 62 as shown in FIG. 20. From this state, the threaded engagement condition between the inside threaded part 62*a* provided on the inner periphery of the upper end portion of the lower tube body 62 and the outside threaded part 61*b* of the upper tube body 61 are regulated by rotating the threaded parts 62*a*, 61*b* in opposite directions from each other so as to loosen the screwing condition, while holding the upper tube body 61 and the lower tube body 62.

As a result, as shown in FIG. 21, the a length of the straight pin part 66*b* of the front end portion of the removing pin 66 is regulated so that the straight pin part 66*b* is protruded from the through hole 64*a* provided at the center of the abutment member 64 of the lower tube body 62.

Then, in the state that a connecting pin is not completely drawn off from a band connecting pin insertion hole of watchband as aforementioned, the straight pin part 66*b* of the front end portion of the removing pin 66 is pushed into the band connecting pin insertion hole by hand or the impact of a hammer or the like. As a result, the connecting pin can be completely drawn off from the band connecting pin insertion hole.

After the use, the threaded engaging condition between the inside threaded part 62*a* provided on the inner periphery of the upper end portion of the lower tube body 62 and the outside threaded part 61*b* of the upper tube body 61 is regulated by rotating the threaded parts 62*a*, 61*b* in opposition directions from each other so as to fasten the threaded engaging condition, while holding the upper tube body 61 and the lower tube body 62. As a result, the tool for wristwatch 60 may be restored to the initial condition such that the straight pin part 66*b* of the front end portion of the removing pin 66 is not protruded from the through hole 64*a* which is provided at the center of the abutment member 64 of the lower tube body 62 as shown in FIG. 20.

In addition, the removing pin 66 is so constructed that the type thereof can be selected and its replacement can be effected by detachably screwing the upper-end threaded part 66*a* of the removing: pin 66 with the inside threaded part 61*a* of the upper tube body 61.

The type of removing pin 66 is not limited to the removing pin 66 having the straight pin part 66*b* at the front end portion thereof, and, for example, removing pin 66 of push pin configuration having recessed part 52*h* at the front end thereof as shown in FIGS. 16 and 17.

With respect to the thus constructed tool for wristwatch 60 according to the fifth embodiment, the screwing condition between the inside threaded part 62*a* provided on the inner periphery of upper end portion of the lower tube body 62 and the outside threaded part 61*b* of the upper tube body 61 is regulated. As a result, the length of protrusion of the straight pin part 66*b* of the front end portion of the removing pin 66 from the through hole 64*a* provided at the center of the abutment member 64 of the lower tube body 62 can be easily regulated.

Heretofore, tool for wristwatch having long straight pin parts have been employed, so that breakage of removing pins has often been experienced. However, with respect to the tool for wristwatch 60 of the present invention, since the protruded straight pin part 66*b* can be adjusted to appropriate length, the occurrence of removing pin breakage has markedly been reduced.

The tool for wristwatch 60 is used for removing connecting pin in which a connecting pin is not completely drawn off from a band connecting pin insertion hole of watchband, after the removing operation by using the tool for wristwatch 20 and 40. Thereafter, the straight pin part 66*b* of the front end portion of the removing pin 66 is pushed into the band connecting pin insertion hole so that the connecting pin can be easily and completely drawn off from the band connecting pin insertion hole. Therefore, the tool for wristwatch is extremely convenient.

In addition, the tool for wristwatch 60 of the present invention can naturally be used in the press insertion of a connecting pin in a band connecting pin insertion hole of watchband.

Nextly, the sixth embodiment of the present invention will be described.

Figure 22:
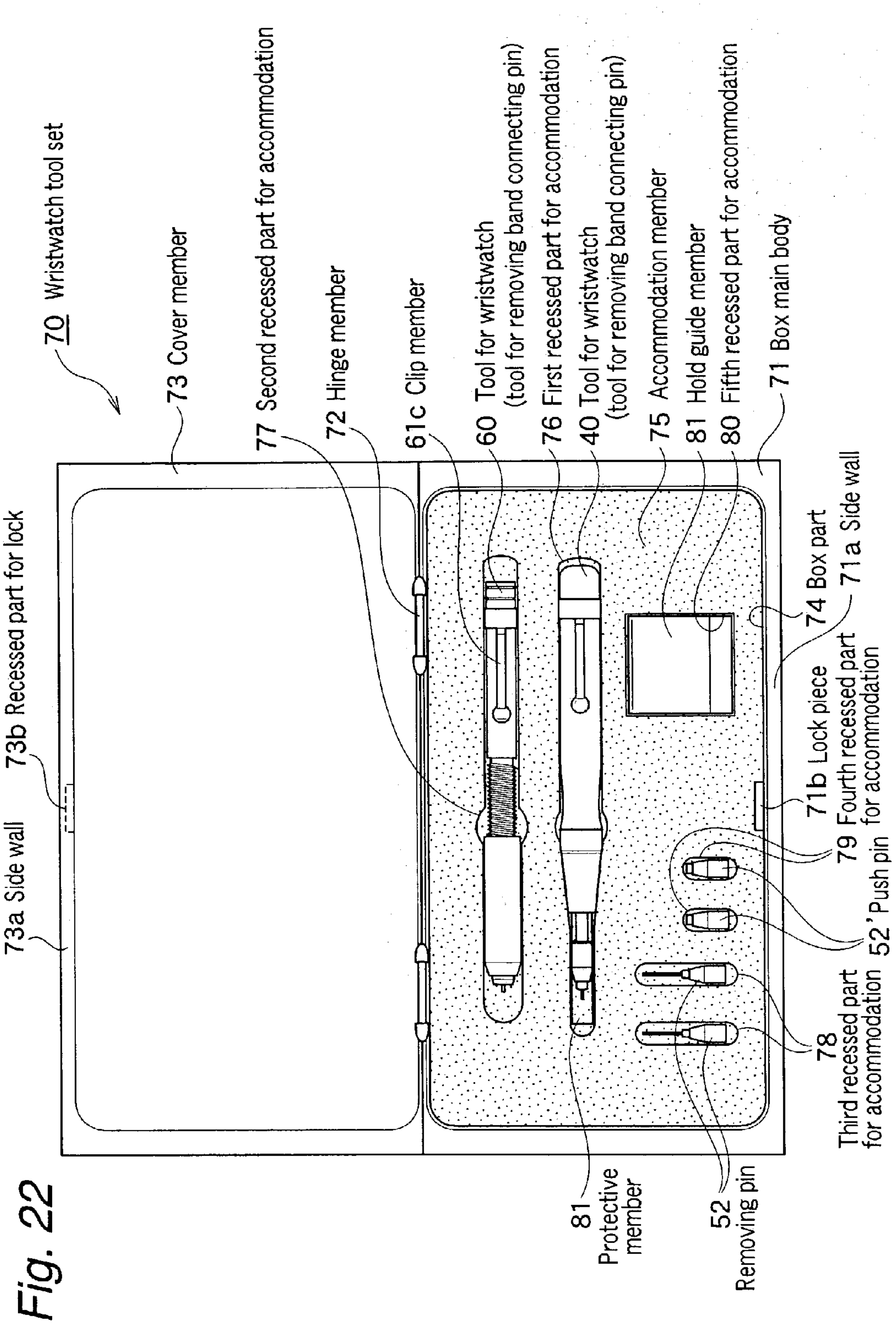
FIG. 22 is a top view of a wristwatch tool set for accommodating the tool for wristwatch according to the present invention.
Figure 23A:
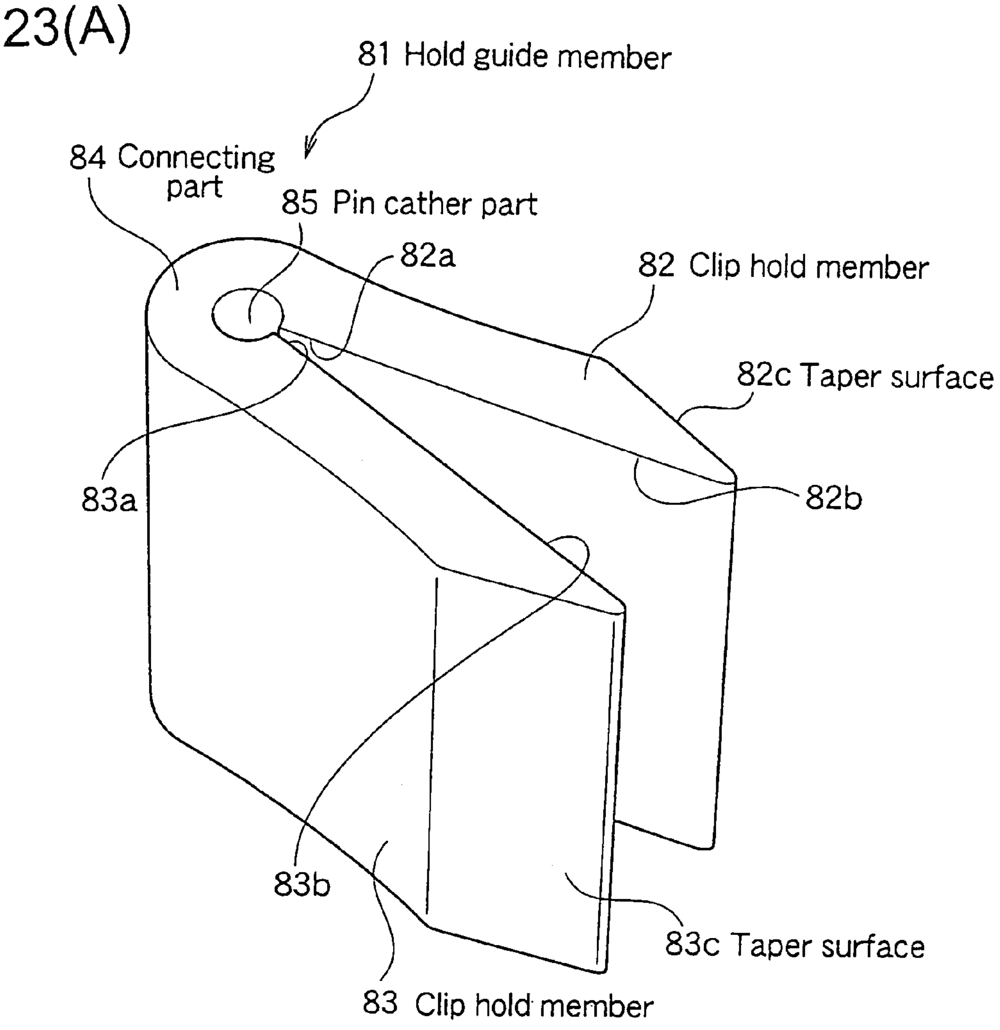
FIG. 23(A) is a perspective view of a hold guide member included in the wristwatch tool set of FIG. 22.
Figure 23B:
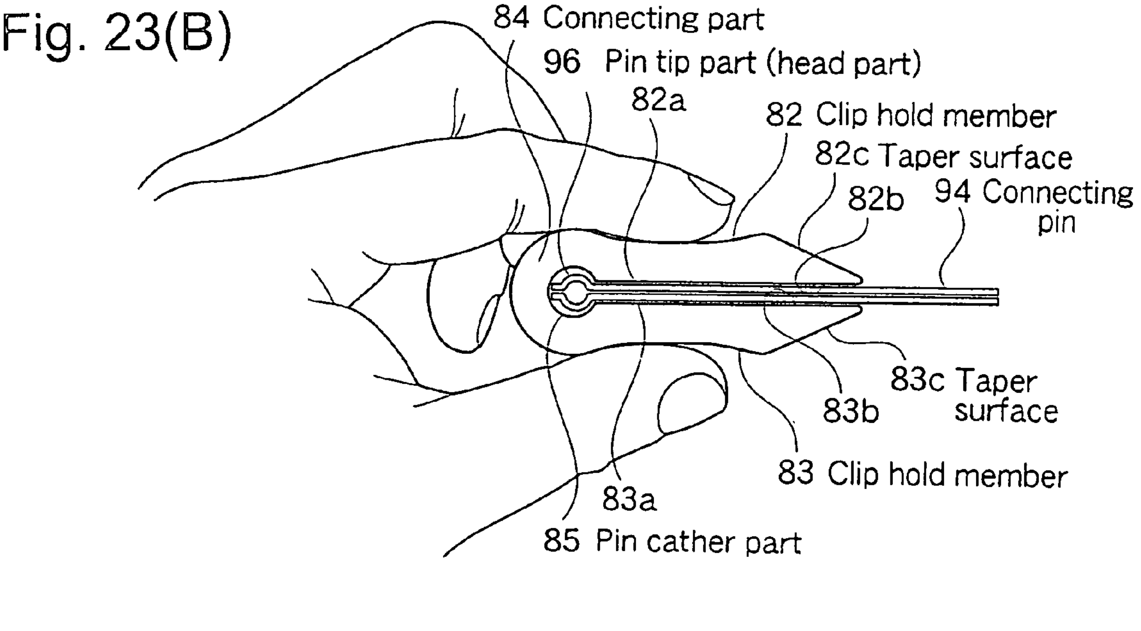
FIG. 23(B) is a top schematic view showing one manner of use of the hold guide member.
Figure 24:
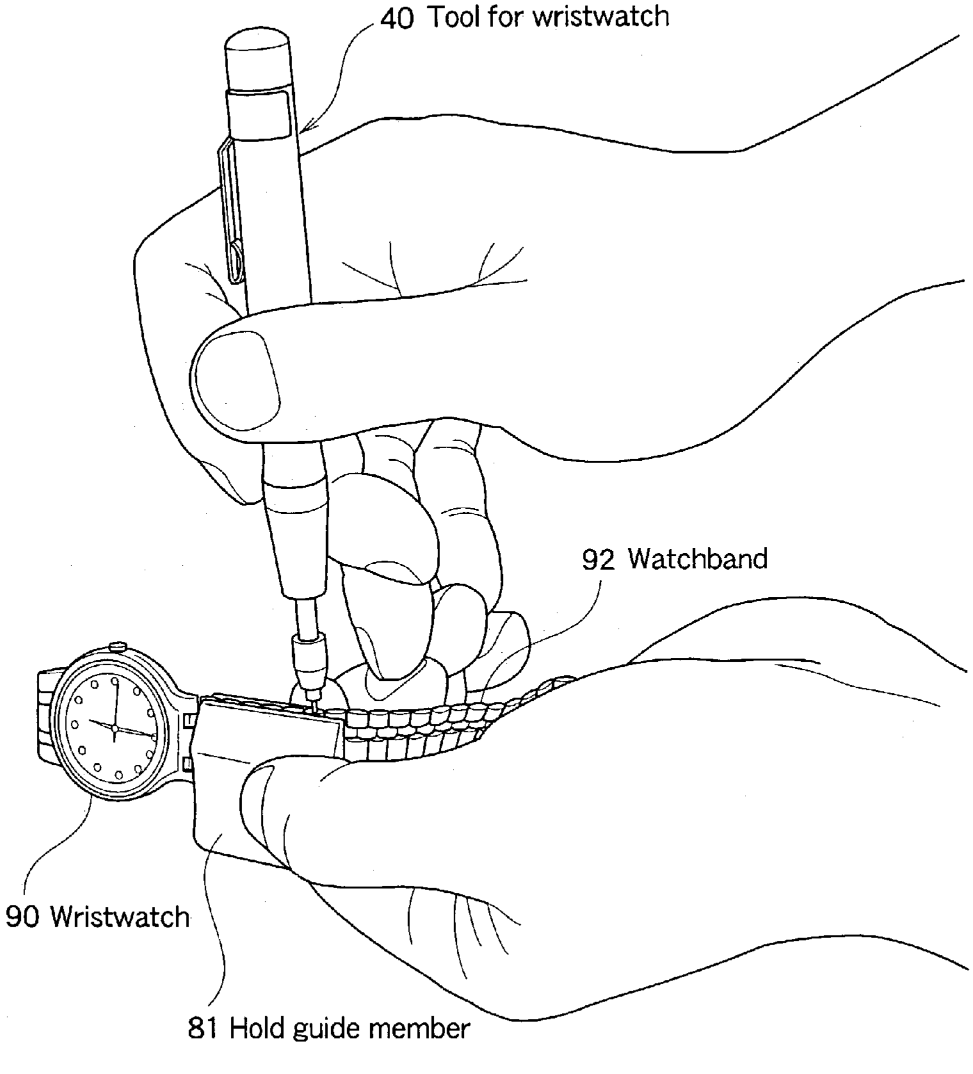
FIG. 24 is a perspective view showing one manner of operation for removing a connecting pin from a watchband connecting pin insertion hole with the use of the tool for wristwatch and hold guide member of FIG. 22.

FIG. 22 is a top view of a wristwatch tool set for accommodating the tool for wristwatch according to the present invention. FIG. 23 is a perspective view of a hold guide member included in the wristwatch tool set of FIG. 22. FIG. 24 is a perspective view showing one manner of operation for removing a connecting pin from a band connecting pin insertion hole of watchband with the use of the tool for wristwatch and hold guide member of FIG. 22.

In FIG. 22, numeral 70 generally denotes a wristwatch tool set for accommodating the tool for wristwatch according to the present invention.

The wristwatch tool set 70 has substantially the shape of a box, and includes underlying box main body 71, cover member 73 openably secured to one side of the box main body 71 by means of hinge member 72, and accommodation member 75 fitted in box part 74 of the box main body 71.

The underlying box main body 71 and the cover member 73 are so constructed that the cover member 73 can be closed and fixed by detachably interlocking lock piece 71*b*, which protrudes from front side wall 71*a* of the box main body 71, in recessed part for lock 73*b*, which is provided in front side wall 73*a* of the cover member 73.

The upper surface side of the accommodation member 75 is provided with first recessed part for accommodation 76 for accommodating the band connecting pin removing tool 40, which is the fourth form of tool for wristwatch of the present invention as shown in FIG. 10, second recessed part for accommodation 77 for accommodating the band connecting pin removing auxiliary tool 60, which is the fifth form of tool for wristwatch as shown in FIG. 18, third recessed part for accommodation 78 for accommodating the removing pin 52 as shown in FIG. 15, and fourth recessed part for accommodation 79 for accommodating the push pin 52' as shown in FIG. 16.

Further, the upper surface side of the accommodation member 75 is provided with fifth recessed part for accommodation 80 for accommodating the hold guide member 81.

The accommodation member 75 is constituted of, for example, a flexible material such as a sponge, a foam or the like so that the marring of band connecting pin removing tools 40, 60, removing pin 52 and push pin 52' by collision to each other during carriage can be avoided.

In this embodiment, for the ease of carriage, the band connecting pin removing tool 40 is fitted with clip member 56*c* of the same structure as that of a fountain pen clip, so that the band connecting pin removing tool 40 can be held on a pocket or the like.

Further, in this embodiment, the band connecting pin removing tool 40 fitted with the removing pin 52 in advance is accommodated in the first recessed part for accommodation 76. The removing pin 52, not shown, is detachably fitted with cylindrical protective member 86 so as to prevent the marring thereof.

On the other hand, the hold guide member 81 has substantially the shape of a clip, and comprises a pair of clip hold members 82, 83 and connecting part 84 which couples the clip hold members 82, 83 at base end portions in curved form to thereby impart elasticity.

The respective inner end portions 82*a*, 83*a* of the clip hold members 82, 83 abut each other, so that respective front end portions 82*b*, 83*b* of the clip hold members 82, 83 are in open condition.

Moreover, on the outside surface of the respective front end portions 82*b*, 83*b* of the clip hold members 82, 83, respective tapered surfaces 82*c*, 83*c* are formed so as to facilitate holding by fingers.

At the inside of the connecting part 84 of the clip hold members 82, 83, pin catcher part 85 which is a recessed part of substantially cylindrical through hole configuration is provided. As shown in FIG. 23(B), the pin catcher part 85 is adapted to hold the tip part (head part) 96 of connecting pin 94 so as to prevent the dropping and missing of connecting pin 94 when removing a connecting pin from a band connecting pin insertion hole.

Although the material of the hold guide member 81 is not particularly limited, it is preferred that the hold guide member 81 should be constituted of a flexible material, for example, a rubber such as silicone rubber or urethane rubber, or a synthetic resin such as polyethylene or polypropylene, from the viewpoint that marring of the wristwatch band at holding thereof can be avoided.

The thus constructed hold guide member 81 can appropriately be used in the operation for, for example, removing a connecting pin from a band connecting pin insertion hole of watchband 92 of wristwatch 90, by using the tool for wristwatch 40 and hold guide member 81 of FIG. 22, as shown in FIG. 24.

Namely, as shown in FIG. 24, the hold guide member 81 is grasped by hand and the watchband 92 of wristwatch 90 is fixed in the state that it is interposed between the clip hold members 82, 83. Then, the tool for wristwatch 40 is applied thereto and a connecting pin is removed from a band connecting pin insertion hole of watchband 92 of wristwatch 90 in the manner mentioned above.

The use of this hold guide member 81 is not limited to the above removing operation by using the tool for wristwatch 40, and the hold guide member 81 can be used in the push insertion operation by using the tool for wristwatch 40 together with the push pin 52', and can be also used in the removing operation by using the tool for wristwatch 60.

By using this hold guide member 81 at the time of removing operation or push insertion operation, the watchband 92 of wristwatch 90 can be fixed in the state that it is interposed between members of the hold guide member 81. Therefore, the operation efficiency can be strikingly enhanced.

Moreover, with respect to this wristwatch tool set 70, a set of band connecting pin removing tools 40, 60, removing pin 52, push pin 52' and hold guide member 81 are accommodated in the accommodation recessed parts 76 to 80 of the accommodation member 75 which is fitted in the box part 74 of the box main body 71 thereof. Therefore, the wristwatch tool set 70 is convenient for carriage and is also improved in any of operations such as removing and push insertion, thereby enhancing the general applicability.

In this embodiment, a set of band connecting pin removing tools 40, 60, removing pin 52, push pin 52' and hold guide member 81 are accommodated in the accommodation recessed parts 76 to 80 of the accommodation member 75 which is fitted in the box part 74 of the box main body 71 thereof. However, the component set is not limited to the above, and can appropriately be changed. For example, the wrench 31 can further be accommodated in the wristwatch tool set 70.

The invention claimed is:

1. A tool for wristwatch, employed to remove a band connecting pin, a case back of wristwatch case or the like, said tool comprising:

a substantially cylindrical tool main body having an inside wall, provided thereinside:

a sliding shaft having a front end adapted to permit replaceable securing of a wristwatch tool component, said sliding shaft having the front end protruding from the tool main body; and hammering means, said hammering means comprising:

a compression spring, and a hammering member adapted to be energized and slid toward the sliding shaft by the compression spring, and a trigger member capable of releasing a spring force of the compression spring when the compression spring has reached a predetermined compression level, the hammering member or the trigger member being urged so that it becomes biased to the inside wall of the tool main body, said sliding shaft and said hammering means so arranged that when the hammering member or the trigger member is urged from the biased position to an erect position, an instantaneous large force is applied to the wristwatch tool component by hammering a rear end of the sliding shaft by means of the hammering means.

2. The tool for wristwatch as claimed in claim 1, wherein the tool main body comprises a head part tube body, a center tube body threadedly engaged with the head part tube body, and a tip tube body threadedly engaged with the center tube body, wherein inside of the center tube body, a partition part having a small diameter hole is formed.

3. The tool for wristwatch as claimed in claim 2, wherein at the side of the tip tube body of the partition part, a slant face, which extends from the small diameter hole to an inside wall of the center tube body, is formed.

4. The tool for wristwatch as claimed in claim 3, wherein the hammering member is disposed on the head part tube body side of the partition part, the hammering member being provided with a center hole; and wherein the trigger member is disposed on the tip tube body side of the partition part, the trigger member comprising:

a trigger shaft having a small diameter part and a large diameter part, the small diameter part adapted to be inserted in the center hole of the hammering member, the large diameter part adapted to pass through the small diameter hole of the partition part, the large diameter part brought into contact with the rear end of the sliding shaft, and a deformed coil spring capable of energizing the trigger shaft toward the sliding shaft while slanting the trigger shaft, the slanted trigger shaft arranged to compress the compression spring through the hammering member by pressing of the front end of the sliding shaft, the trigger shaft arranged to stand erect in the moment that the large diameter part of the trigger shaft is fitted in the small diameter hole.

5. The tool for wristwatch as claimed in claim 2, wherein the compression spring is disposed in the center tube body and the head part tube body, and the spring force of the compression spring is adjustable by regulating a length of threaded engagement of the center tube body with the head tube body.

6. The tool for wristwatch as claimed in claim 1, further comprising pliers having a one-side functioning part and an other-side functioning part, wherein:

a head part of the tool for wristwatch engages with the inside of the one-side functioning part of the pliers, and the tool main body or the sliding shaft is arranged so as to pass through a through hole of the other-side functioning part of the pliers, the tool for wristwatch further comprising a spring capable of energizing the tool main body toward the one-side functioning part and a jig for fixing a wristwatch exterior part arranged outside the other-side functioning part.

7. The tool for wristwatch as claimed in claim 1, wherein the securing of the wristwatch tool component to the front end of the sliding shaft is accomplished by at least one of insertion of a shaft in a shaft hole under pressure, screwing of a shaft in a shaft hole with a set screw hole, engagement of an external thread with an internal thread, interlock of a protrudent part with a recessed part and interlock of a taper shaft with a bearing.

8. The tool for wristwatch as claimed in claim 7, wherein at the front end portion of the sliding shaft, an interlock groove for securing the wristwatch tool component is formed, at the center of the wristwatch tool component, a lock hole is formed and inside of the lock hole, a recessed groove is formed, and an O-ring member consisting of an elastic member is fitted in the recessed groove, the O-ring member arranged so as to be fitted in the interlock groove of the sliding shaft, thereby enabling detachably securing the wristwatch tool component to the front end portion of the sliding shaft.

9. The tool for wristwatch as claimed in claim 1, wherein the base end portion of the wristwatch tool component is provided with an abutment member consisting of a flexible member.

10. The tool for wristwatch as claimed in claim 1, wherein a pin or deformed pin for removing a band connecting pin as the wristwatch tool component is detachably secured.

11. The tool for wristwatch as claimed in claim 10, wherein the pin for removing a band connecting pin is constituted of a superelastic metallic material consisting of an alloy which contains nickel/titanium (Ni—Ti) or nickel/titanium/cobalt (Ni—Ti—Co) as a principal component.

12. The tool for wristwatch as claimed in claim 10, wherein the pin for removing a band connecting pin is a push pin having a front end in the shape of a recessed part of a cone.

13. The tool for wristwatch as claimed in claim 10, wherein the pin for removing a band connecting pin is a push pin having a front end provided with a recessed part consisting of a blind hole adapted to have the connecting pin fitted therein.

14. The tool for wristwatch as claimed in claim 1, wherein a wrench for removing a bezel or a case back as the wristwatch tool component is detachably secured.

15. The tool for wristwatch as claimed in claim 3, wherein the hammering member is disposed on the head part tube body side of the partition part, the hammering member being provided with a center hole, and wherein the trigger member comprises:

a trigger shaft being disposed under the partition part of the center tube body, the trigger shaft at its upper end being provided with an abutment surface of slanted cone shape, the trigger shaft being provided with a vertical through hole, an upper part of the sliding shaft, the upper part adapted to pass through the through hole of the trigger shaft and adapted to be fitted in the center hole of the hammering member and the hammering member having its upper end portion formed into substantially a dome configuration, the tool for wristwatch is arranged that the hammering member is energized downward by the compression spring, whereby the lower end of the hammering member is abutted to the abutment surface of slanted cone shape of the upper end of the trigger shaft, resulting that an axial center of the hammering member is biased, the tool for wristwatch is so arranged that the upper part of the sliding shaft raises the hammering member by pressing of the front end of the sliding shaft, whereby the compression spring is compressed by the hammering member having been biased toward the inside wall, and the upper end portion of substantially dome configuration of the raised hammering member is guided by the inside wall of the through hole of the center tube body, whereby the axial center of the hammering member is moved toward the center, with the result that the hammering member stands erect.

16. The tool for wristwatch as claimed in claim 15, wherein the hammering member is raised in accordance with rise of the sliding shaft so that a slant face provided on a large diameter part of the lower end portion of the hammering member is guided by the slant face part of the partition part, whereby the axial center of the hammering member is gradually departed from the inner wall and shifts toward center so that the hammering member is thrust upward.

17. The tool for wristwatch as claimed in claim 15, wherein a compression coil spring is interposed between a lower end of the trigger shaft and the sliding shaft, the tool for wristwatch is so arranged that the trigger shaft is energized upward by a spring force of the compression coil spring, whereby the abutment surface of slanted cone shape of the upper end of the trigger shaft is abutted to the large diameter part of the lower end portion of the hammering member, the tool for wristwatch is arranged that the sliding shaft is energized downward by the spring force of the compression coil spring, whereby the front end of the sliding shaft protrudes from the tip tube body.

18. A tool for wristwatch, employed to remove a connecting pin from a band connecting pin insertion hole of watchband, said tool comprising:

a substantially cylindrical upper tube body having an inside threaded part provided on an inside wall of lower end portion thereof and having an outside threaded part provided on an outside wall thereof, a removing pin detachably and threadedly engaging the inside threaded part of the upper tube body, and a substantially cylindrical lower tube body of taper outline being detachably fitted to a lower portion of the upper tube body by threadedly engaging an inside threaded part provided on an inner periphery of the lower tube body with the outside threaded part of the upper tube body, the tool for wristwatch is so arranged that a length of protrusion of a front end portion of the removing pin from a through hole of front end of the lower tube body can be adjusted by regulating a condition of threaded engagement of the inside threaded part provided on the inner periphery of upper end portion of the lower tube body with the outside threaded part of the upper tube body.

19. A tool for wristwatch, employed to remove a connecting pin in the event that a connecting pin is not completely drawn off from a band connecting pin insertion hole of watchband, after the connecting pin is removed from the band connecting pin insertion hole by using the tool for wristwatch claimed in claim 1, said tool comprising:

a substantially cylindrical upper tube body having an inside threaded part provided on an inside wall of lower end portion thereof and having an outside threaded part provided on an outside wall thereof, a removing pin being detachably and threadedly engaged with the inside threaded part of the upper tube body, and a substantially cylindrical lower tube body of taper outline being detachably fitted to a lower portion of the upper tube body by threadedly engaging an inside threaded part provided on an inner periphery of the lower tube body with the outside threaded part of the upper tube body, the tool for wristwatch is so arranged that a length of protrusion of a front end portion of the removing pin from a through hole of front end of the lower tube body can be adjusted by regulating a condition of threaded engagement of the inside threaded part provided on the inner periphery of upper end portion of the lower tube body with the outside threaded part of the upper tube body.

20. The tool for wristwatch as claimed in claim 18, wherein at the front end of the lower tube body, an abutment member consisting of a flexible member is disposed.

21. The tool for wristwatch as claimed in claim 18, wherein the removing pin is constituted of a superelastic metallic material consisting of an alloy which contains nickel/titanium (Ni—Ti) or nickel/titanium/cobalt (Ni—Ti—Co) as a principal component.

* * * * *